United States Patent [19]

Oguro et al.

[11] Patent Number: 5,712,947
[45] Date of Patent: Jan. 27, 1998

[54] METHOD OF RECORDING ID SIGNALS FOR RETRIEVING IMAGES, METHOD OF RETRIEVING IMAGES, AND APPARATUS FOR REPRODUCING RECORDED IMAGES

[75] Inventors: Masaki Oguro, Tokyo; Teruhiko Kori; Ken Iizuka, both of Kanagawa, all of Japan

[73] Assignee: Sony Corporation, Tokyo, Japan

[21] Appl. No.: 683,024

[22] Filed: Jul. 15, 1996

Related U.S. Application Data

[63] Continuation of Ser. No. 286,213, Aug. 5, 1994, abandoned.

[30] Foreign Application Priority Data

Aug. 14, 1993 [JP] Japan ................................. 5-222237

[51] Int. Cl.$^6$ .............................. G11B 5/02; G11B 15/48; H04N 5/91
[52] U.S. Cl. .............................. 386/69; 386/95; 386/120; 360/2.7; 360/14.4
[58] Field of Search ................................. 360/72.2, 72.1, 360/14.1, 18, 27, 48, 74.4; 386/65, 68, 69, 38, 95, 106, 107, 120; 348/220

[56] References Cited

U.S. PATENT DOCUMENTS

| | | | |
|---|---|---|---|
| 5,239,428 | 8/1993 | Nishida et al. | 360/72.2 |
| 5,260,787 | 11/1993 | Capitant et al. | 348/441 X |
| 5,365,380 | 11/1994 | Tanaka | 360/32 |
| 5,432,646 | 7/1995 | Nakamura et al. | 360/14.1 |

*Primary Examiner*—Andrew L. Sniezek
*Assistant Examiner*—Regina Y. Neal
*Attorney, Agent, or Firm*—William S. Frommer; Alvin Sinderbrand

[57] ABSTRACT

On tape carrying a mixture of a static image recording portion and a dynamic image recording portion, ID (identification) signals are recorded to specify only a specific static image for retrieval. During image recording, the PP (Photo/Picture) ID signal indicative of the static image recording portion is automatically recorded on the static image recording portion for a sufficiently long duration to allow its detection during quick search. When a desired static image is determined on the screen, the INDEX ID signal indicative of the static image is subsequently implanted only in the static image recording portion. Thus, the desired static image can be retrieved by first searching the PP ID signal quickly to locate the static image recording portion and then searching the INDEX ID signal in the static image recording portion. These two ID signals can also be subsequently implanted in the dynamic image recording portion to retrieve any one frame image.

20 Claims, 38 Drawing Sheets

FIG. 14
PRIOR ART
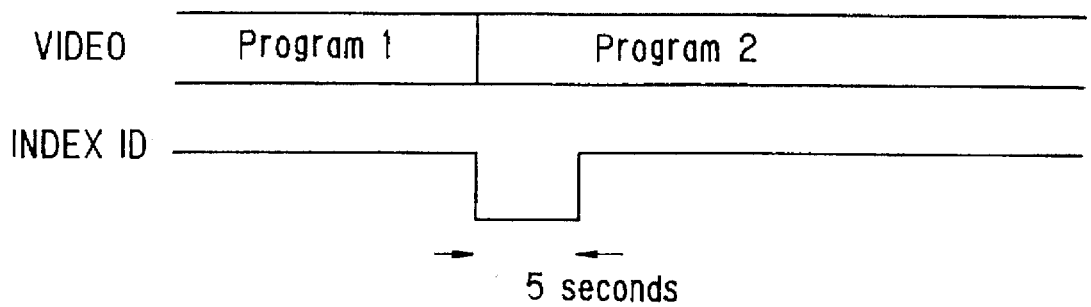
FIG. 16
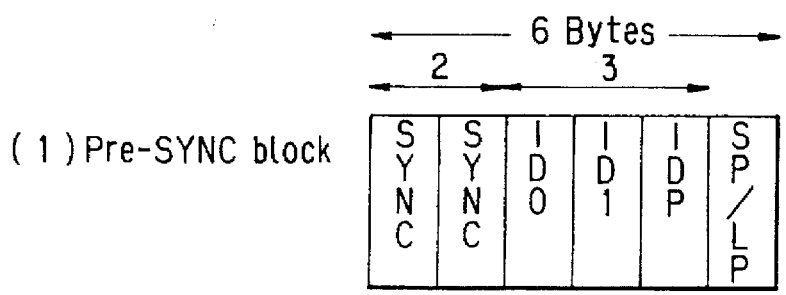
(1) Pre-SYNC block
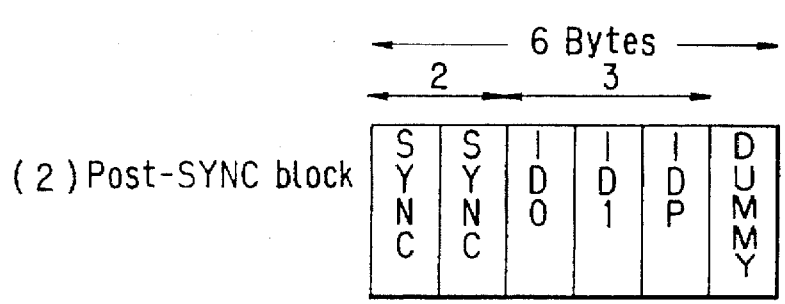
(2) Post-SYNC block

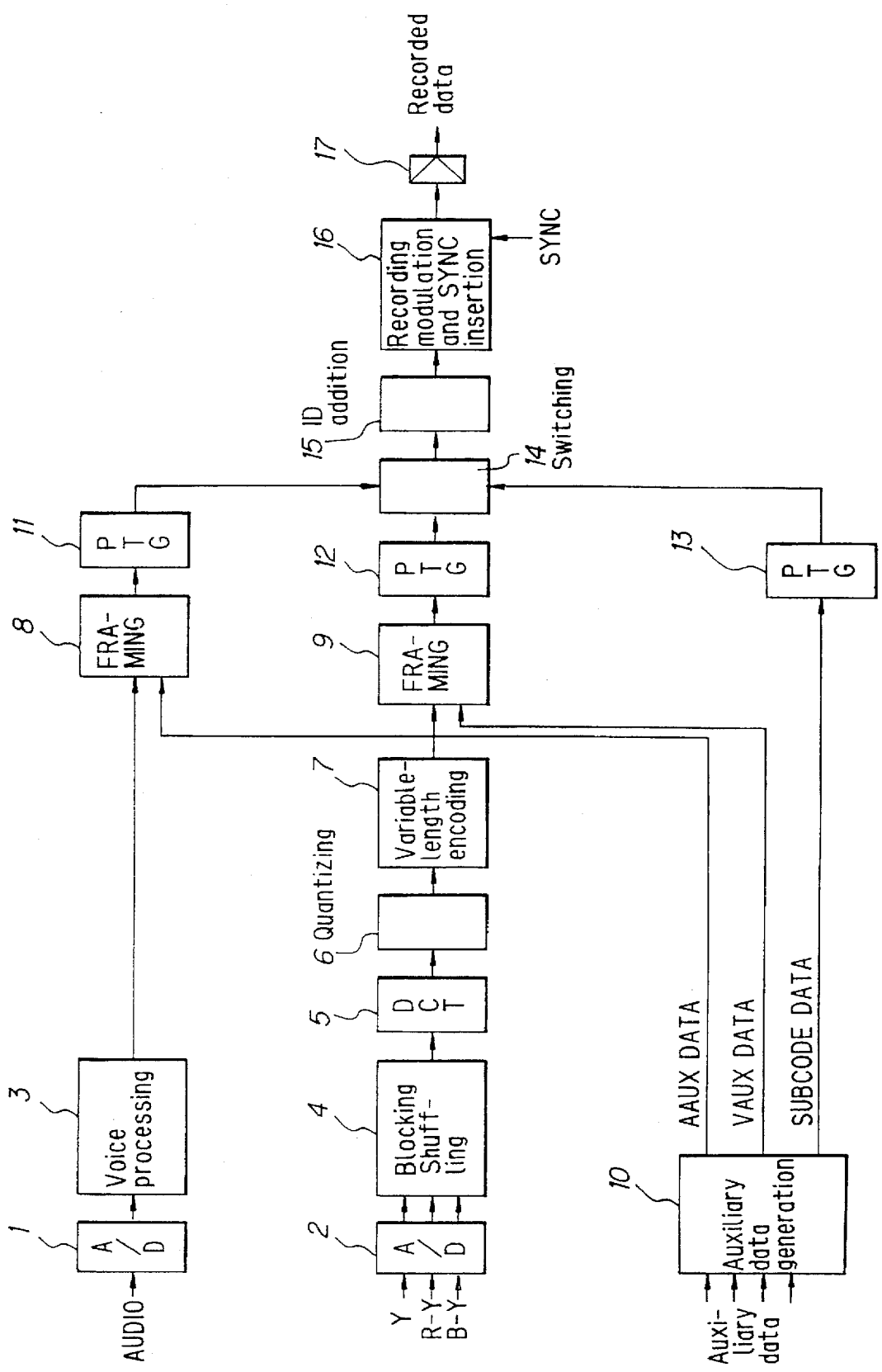

(AUDIO)

▨ : AAUX

FIG. 23A

AAUX SYNC,
Audio SYNC,
Video SYNC,

|     | ID0    | ID1   |
|-----|--------|-------|
| MSB | SEQ 3  | SYNC7 |
|     | SEQ 2  | SYNC6 |
|     | SEQ 1  | SYNC5 |
|     | SEQ 0  | SYNC4 |
|     | TRACK3 | SYNC3 |
|     | TRACK2 | SYNC2 |
|     | TRACK1 | SYNC1 |
| LSB | TRACK0 | SYNC0 |

FIG. 23B

Pre-SYNC,
Post-SYNC,
C2 PARITY SYNC,

|     | ID0        | ID1   |
|-----|------------|-------|
| MSB | AP1/AP2  2 | SYNC7 |
|     | AP1/AP2  1 | SYNC6 |
|     | AP1/AP2  0 | SYNC5 |
|     | SEQ 0      | SYNC4 |
|     | TRACK3     | SYNC3 |
|     | TRACK2     | SYNC2 |
|     | TRACK1     | SYNC1 |
| LSB | TRACK0     | SYNC0 |

FIG. 24

| Word Name | | MSB | | | | | | LSB |
|---|---|---|---|---|---|---|---|---|
| PC0 | (ITEM) | | | | | | | |
| PC1 | (DATA) | | | | | | | |
| PC2 | | | | | | | | |
| PC3 | | | | | | | | |
| PC4 | | | | | | | | |

FIG. 25

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | LINE |
| 0 1 1 0 | x x x x | VAUX |
| 0 1 1 1 | x x x x | AAUX |
| 1 0 0 0 | x x x x | RESERVED |
| ⋮ | | |
| 1 1 1 0 | x x x x | |
| 1 1 1 1 | a a a a | SOFT MODE |
| 1 1 1 1 | 1 1 1 1 | NO INFORMATION | a a a a : 0 0 0 0 ~ 1 1 1 0
x x x x : 0 0 0 0 ~ 1 1 1 1

(VAUX Pack Structure)

FIG.27

(VAUX)

60~65 : VAUX Main area

Optional actual data size 1560 Bytes

| PACK No. \ TRAC. No. | 1 | 2 | 3 | 4 | 5 | 6 | 7 | 8 | 9 | 10 |
|---|---|---|---|---|---|---|---|---|---|---|
| 45 | 65 |  | 65 |  | 65 |  | 65 |  | 65 |  |
| 44 | 64 |  | 64 |  | 64 |  | 64 |  | 64 |  |
| 43 | 63 |  | 63 |  | 63 |  | 63 |  | 63 |  |
| 42 | 62 |  | 62 |  | 62 |  | 62 |  | 62 |  |
| 41 | 61 |  | 61 |  | 61 |  | 61 |  | 61 |  |
| 40 | 60 |  | 60 |  | 60 |  | 60 |  | 60 |  |
| ... |  |  |  |  |  |  |  |  |  |  |
| 5 |  | 65 |  | 65 |  | 65 |  | 65 |  | 65 |
| 4 |  | 64 |  | 64 |  | 64 |  | 64 |  | 64 |
| 3 |  | 63 |  | 63 |  | 63 |  | 63 |  | 63 |
| 2 |  | 62 |  | 62 |  | 62 |  | 62 |  | 62 |
| 1 |  | 61 |  | 61 |  | 61 |  | 61 |  | 61 |
| 0 |  | 60 |  | 60 |  | 60 |  | 60 |  | 60 |

FIG. 28A

VAUX SOURCE Pack

| MSB | | | | | | | | LSB |
|---|---|---|---|---|---|---|---|---|
| PC 0 | 0 | 1 | 1 | 0 | 0 | 0 | 0 | 0 |
| PC 1 | TENS OF TV CHANNEL | | | | UNITS OF TV CHANNEL | | | |
| PC 2 | B/W | EN | | CLF | HUNDREDS OF TV CHANNEL | | | |
| PC 3 | SOURCE CODE | | 50/60 | | STYPE | | | |
| PC 4 | TUNER CATEGORY | | | | | | | |

FIG. 28B

VAUX SOURCE CONTROL Pack

| MSB | | | | | | | | LSB |
|---|---|---|---|---|---|---|---|---|
| PC 0 | 0 | 1 | 1 | 0 | 0 | 0 | 0 | 1 |
| PC 1 | RESERVED | | | | | | | |
| PC 2 | REC ST | 1 | REC MODE | | 1 | DISP | | |
| PC 3 | FF | FS | FC | IL | ST | SC | BCSYS | |
| PC 4 | 1 | GENRE CATEGORY | | | | | | |

FIG. 28C

VAUX REC DATE Pack

| MSB | | | | | | | | LSB |
|---|---|---|---|---|---|---|---|---|
| PC 0 | 0 | 1 | 1 | 0 | 0 | 0 | 1 | 0 |
| PC 1 | DS | TM | TIME ZONE | | | | | |
| PC 2 | 1 | 1 | DAY | | | | | |
| PC 3 | WEEK | | | MONTH | | | | |
| PC 4 | YEAR | | | | | | | |

FIG. 28D

VAUX REC TIME Pack

| MSB | | | | | LSB |
|---|---|---|---|---|---|
| PC 0 | 0 | 1 | 1 | 0 | 0 0 1 1 |
| PC 1 | S 2 | S 1 | TENS OF FR. | UNITS OF FRAMES | |
| PC 2 | S 3 | | TENS OF SECONDS | UNITS OF SECONDS | |
| PC 3 | S 4 | | TENS OD MINUTES | UNITS OF MINUTES | |
| PC 4 | S 6 | S 5 | TENS OF H. | UNITS OF HOURS | |

FIG. 28E

VAUX REC TIME BINARY GROUP Pack

| MSB | | | | | | | | LSB |
|---|---|---|---|---|---|---|---|---|
| PC 0 | 0 | 1 | 1 | 0 | 0 | 1 | 0 | 0 |
| PC 1 | 2nd BINARY | | | | 1st BINARY | | | |
| PC 2 | 4th BINARY | | | | 3rd BINARY | | | |
| PC 3 | 6th BINARY | | | | 5th BINARY | | | |
| PC 4 | 8th BINARY | | | | 7th BINARY | | | |

FIG. 29

| S. B. NO. | Former 5 tracks | Latter 5 tracks |
|---|---|---|
| 0 | optional data | optional data |
| 1 | optional data | optional data |
| 2 | optional data | optional data |
| 3 | TTC | TTC |
| 4 | TTC or BIN | REC DATE |
| 5 | TTC | REC TIME |
| 6 | optional data | optional data |
| 7 | optional data | optional data |
| 8 | optional data | optional data |
| 9 | TTC | TTC |
| 10 | TTC or BIN | REC DATE |
| 11 | TTC | REC TIME |

FIG. 30

TITLE TIME CODE

| | MSB | | | | | | | LSB |
|---|---|---|---|---|---|---|---|---|
| PC 0 | 0 | 0 | 0 | 1 | 0 | 0 | 1 | 1 |
| PC 1 | S 2 | S 1 | TENS OF FR. | | UNITS OF FRAMES | | | |
| PC 2 | S 3 | TENS OF SECONDS | | | UNITS OF SECONDS | | | |
| PC 3 | S 4 | TENS OD MINUTES | | | UNITS OF MINUTES | | | |
| PC 4 | S 6 | S 5 | TENS OF H. | | UNITS OF HOURS | | | |

FIG.31

| SYNC BLOCK No. \ TRACK No. → | 0 | 1 | 2 | 3 | 4 | 5 | 6 | 7 | 8 | 9 |
|---|---|---|---|---|---|---|---|---|---|---|
| 11 | C | C | C | C | C | E | E | E | E | E |
| 10 | B | B | B | B | B | D | D | D | D | D |
| 9 | A | A | A | A | A | A | A | A | A | A |
| 8 | f | c | f | c | f | m | i | m | i | m |
| 7 | e | b | e | b | e | k | h | k | h | k |
| 6 | d | a | d | a | d | j | g | j | g | j |
| 5 | C | C | C | C | C | E | E | E | E | E |
| 4 | B | B | B | B | B | D | D | D | D | D |
| 3 | A | A | A | A | A | A | A | A | A | A |
| 2 | c | f | c | f | c | i | m | i | m | i |
| 1 | b | e | b | e | b | h | k | h | k | h |
| 0 | a | d | a | d | a | g | j | g | j | g |

FIG.32

| SYNC BLOCK No. \ TRACK No. → | 0 | 1 | 2 | 3 | 4 | 5 | 6 | 7 | 8 | 9 | 10 | 11 |
|---|---|---|---|---|---|---|---|---|---|---|---|---|
| 11 | C | C | C | C | C | C | E | E | E | E | E | E |
| 10 | B | B | B | B | B | B | D | D | D | D | D | D |
| 9 | A | A | A | A | A | A | A | A | A | A | A | A |
| 8 | f | c | f | c | f | c | m | i | m | i | m | i |
| 7 | e | b | e | b | e | b | k | h | k | h | k | h |
| 6 | d | a | d | a | d | a | j | g | j | g | j | g |
| 5 | C | C | C | C | C | C | E | E | E | E | E | E |
| 4 | B | B | B | B | B | B | D | D | D | D | D | D |
| 3 | A | A | A | A | A | A | A | A | A | A | A | A |
| 2 | c | f | c | f | c | f | i | m | i | m | i | m |
| 1 | b | e | b | e | b | e | h | k | h | k | h | k |
| 0 | a | d | a | d | a | d | g | j | g | j | g | j |

FIG.33

| | ID0 | | ID1 | ID P | |
|---|---|---|---|---|---|
| MSB | | LSB MSB | LSB | MSB | LSB |
| | | | S.B.NO. | | |
| FR | AP3 | ABSOLUTE | 0 | PARITY | |
| FR | TAG | TRACK | 1 | PARITY | |
| FR | TAG | NO. | 2 | PARITY | |
| FR | TAG | ABSOLUTE | 3 | PARITY | |
| FR | TAG | TRACK | 4 | PARITY | |
| FR | TAG | NO. | 5 | PARITY | |
| FR | AP3 | ABSOLUTE | 6 | PARITY | |
| FR | TAG | TRACK | 7 | PARITY | |
| FR | TAG | NO. | 8 | PARITY | |
| FR | TAG | ABSOLUTE | 9 | PARITY | |
| FR | TAG | TRACK | 10 | PARITY | |
| FR | RSV | NO. | 11 | PARITY | |

RSV : RESERVED

| INDEX ID | SKIP ID | PP ID |
|---|---|---|

FIG.38

| SYNC block No. | Even track | Odd track |
|---|---|---|
| 0 ~ 2 | 2 | 3 |
| 3 ~ 5 | 1 | 1 |
| 6 ~ 8 | 3 | 2 |
| 9 ~ 11 | 1 | 1 |

FIG.39

| Track No. 0 ~ 4 | Track No. 5 ~ 9 |
|---|---|
| 1 | 2 |

FIG. 41A

| SYNC block No. | |
|---|---|
| No.3~5, No.9~11 | No.0~2, No.6~8 |
| P1 | P2 |

FIG. 41B

| SYNC block No. | | | | | |
|---|---|---|---|---|---|
| No.3 | No.4 | No.5 | No.9 | No.10 | No.11 |
| P6 | P5 | P4 | P3 | P2 | P1 |

FIG. 41C

| | SYNC block No. | | | | | |
|---|---|---|---|---|---|---|
| | No.0 | No.1 | No.2 | No.6 | No.7 | No.8 |
| Even track | P6 | P5 | P4 | P3 | P2 | P1 |
| Odd track | P3 | P2 | P1 | P6 | P5 | P4 |

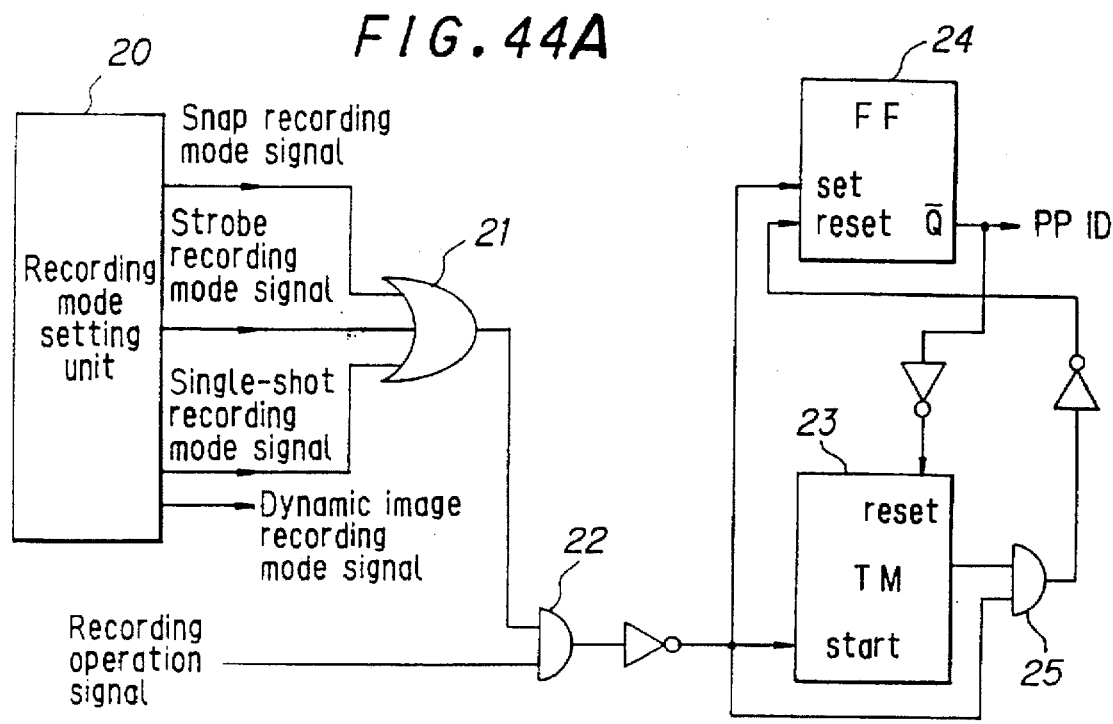
FIG. 44A
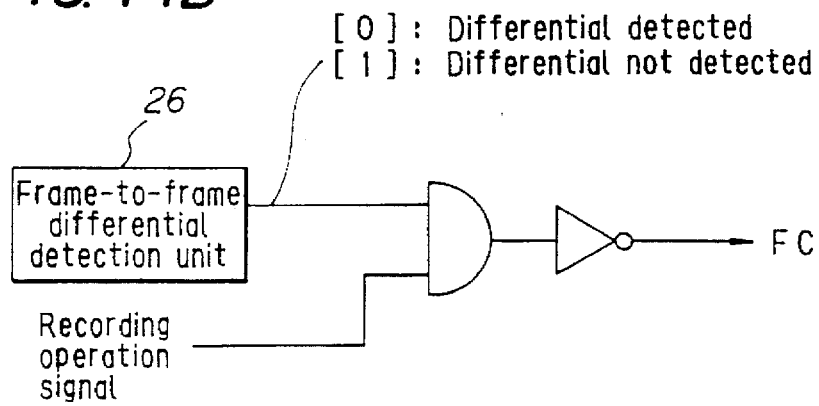
FIG. 44B
FIG. 44C

METHOD OF RECORDING ID SIGNALS FOR RETRIEVING IMAGES, METHOD OF RETRIEVING IMAGES, AND APPARATUS FOR REPRODUCING RECORDED IMAGES

This application is a continuation of application Ser. No. 08/286,213, filed Aug. 5, 1994 abandoned.

BACKGROUND OF THE INVENTION

1. Field of the Invention

The present invention relates to a method of recording ID signals for retrieving images, a method of retrieving images, and an apparatus for reproducing recorded images for use in retrieving desired images with an image recording/reproducing apparatus.

2. Description of the Related Art

Conventionally, when reproducing images recorded on tape with an image recording/reproducing apparatus such as a video cassette recorder (VCR) integrated with a camera, the INDEX ID signal is employed as shown in FIG. 14 to allow quick location of the beginning of a desired program. FIG. 14 illustrates a case in which an attempt is made to locate the beginning of Program 2 on user tape with the INDEX ID signal recorded at the beginning of Program 2. In this case, the beginning of Program 2 can be located by searching the INDEX ID signal.

Generally, the above-mentioned conventional method is very effective in locating the beginning of dynamic images of long duration. Recently, however, those camera-integrated VCRs have become commercially available which are so configured as to be capable of recording not only dynamic images but also static images. With these types of apparatus, the conventional method using the INDEX ID signal is not always effective in locating the beginning of only a specific static image for search or printout on tape carrying a mixture of a dynamic image recording portion and a static recording portion.

More specifically, static images can be searched quickly by recording ID signals of long duration, such as the above-mentioned INDEX ID signal, for retrieving static images. Since a single static image generally has a very short recording time, however, an attempt to retrieve a specific static image by recording the INDEX ID signal as mentioned above on tape carrying a sequence of multiple static images usually results in inclusion of the multiple static images within the boundary of the INDEX ID signal. In the conventional method using the INDEX ID signal, therefore, the multiple static images included in its boundary cannot be retrieved individually.

Further, there is known another conventional method of reproducing static images, whereby image signals in one frame for reproduction is stored in image memory, from which the image signals are read repeatedly to display static images with tape kept in a stopped state. In the case of tape carrying a mixture of a recording portion for static images to be reproduced in this conventional method and a recording portion for ordinary dynamic images, it is desirable to automatically switch the processing of reproduced signals and the running state of tape in the static image recording portion.

SUMMARY OF THE INVENTION

A first aspect of the present invention discloses a method of recording ID signals for retrieving images, which comprises recording a first ID signal for retrieving a recording portion for a desired image on a recording medium in correspondence with the recording portion for more than a predetermined duration and subsequently implanting a second ID signal for retrieving the recording portion only in the recording portion. In this aspect of the present invention, it is preferable to set the predetermined duration to a sufficiently large value to allow detection of the first ID signal during quick search.

A second aspect of the present invention discloses a method of retrieving images on a recording medium, which comprises recording a first ID signal for retrieving a recording portion for a desired image in correspondence with the recording portion for more than a predetermined duration, recording a data signal indicative of the differences between recorded images between successive frames, and subsequently implanting a second ID signal only in the recording portion, wherein at least either the recording start point and the recording end point of a single image in the recording portion is identified on the basis of the data signal.

A third aspect of the present invention discloses an apparatus for reproducing recorded images on a recording medium carrying an image signal and an ID signal indicative of whether the image signal is a type of signal which should be reproduced by stopping the recording medium from running, which comprises a circuit for identifying the type of the image signal on the basis of the ID signal reproduced and a control circuit for controlling the running state of the recording medium in response to the output of the identification circuit.

According to the present invention, the multiple ID signals used in combination allow quick search of static images and search of only dynamic images in a specific frame while the data signal indicative of the differences between recorded images in successive frames allows sequential search of other static images. On the basis of the ID signal indicative of whether the recorded image signal is a type of signal which should be reproduced by stopping the recording medium from running, the running state of the recording medium during reproducing is automatically switched to a state suitable for the reproduced image signal.

Thus, the present invention allows retrieval of any static image for search or printout on tape carrying a mixture of a recording portion for dynamic images and a recording portion for static images, facilitates a sequential retrieval of the next static image in retrieving multiple static images, and allows automatic switching of a recorded image reproduction apparatus to an operating state suitable for the type of the image to be reproduced from tape carrying a mixture of a recording portion for dynamic images and a recording portion for static images.

BRIEF DISCLOSURE OF THE DRAWINGS

FIG. 14 is a timing chart illustrating a procedure for recording the INDEX ID signal for retrieving related dynamic images.

FIGS. 16A–16B are diagrams illustrating the configuration of pre-SYNC and post-SYNC.

FIG. 18 is a schematic diagram illustrating a procedure for processing signals in the recording system of a digital VTR.

FIGS. 23A–23B are diagrams illustrating ID0 and ID1 for SYNC blocks in the AUDIO and VIDEO areas.

FIG. 24 is a diagram illustrating a basic pack structure.

FIG. 25 is a diagram illustrating pack classification by major item.

FIG. 27 is a diagram illustrating the configuration of VAUX data on one track.

FIGS. 28A–28E are diagrams illustrating a pack configuration in a main area in the VAUX region.

FIG. 29 is a diagram illustrating pack data to be recorded in the SUBCODE area in one frame.

FIG. 30 is a diagram illustrating the configuration of the TITLE TIME CODE pack.

FIG. 31 is a diagram illustrating repetitive recording of pack data in the SUBCODE area in one frame in a digital VTR for NTSC signals.

FIG. 32 is a diagram illustrating repetitive recording of pack data in the SUBCODE area in one frame in a digital VTR for PAL signals.

FIG. 33 is a diagram illustrating the IDs of a subcode signal.

FIG. 38 is a diagram illustrating a procedure for switching the SW1 and SW2 of a subcode signal generation circuit.

FIG. 39 is a diagram illustrating a procedure for switching the SW3 of a subcode signal generation circuit.

FIGS. 41A–41C are diagrams illustrating a procedure for switching the SW1 to SW3 of a subcode data reproduction circuit.

FIGS. 44A–44C are diagrams illustrating a PP ID signal generation circuit, a FC signal generation circuit, and a SC signal generation circuit.

DETAILED DESCRIPTION OF PREFERRED EMBODIMENTS

A method of recording ID signals for retrieving images, a method of retrieving images, and an apparatus for reproducing recorded images according to the present invention will now be described below with its preferred embodiments applied to an image compression recording system video tape recorder (hereinafter referred to simply as a "digital VTR") under the following headings:

1. Recording Format of Digital VTR
2. Signal Processing in Recording System
   1) Audio Signal Processing
   2) Video Signal Processing
3. Structure of ID Portion in AUDIO Area and VIDEO Area
4. Structure of AAUX Data and VAUX Data
5. Structure of Subcode Data
   1) Structure of Data Portion
   2) Structure of ID Portion
   3) Subcode Signal Generation Circuit and Subcode Data Reproduction Circuit
6. Retrieval and Search of Static Images
   1) Types of Static Image Recording
   2) Types of ID Signals for Search
   3) Retrieval of Specific Static Images from Static Image Recording Portion
   4) Retrieval of Specific Frame Images from Dynamic Image Recording Portion
   5) Method of Subsequently Implanting INDEX ID Signal
   6) Search of Static Images
7. Circuit for Automatically Switching Reproduction Mode of Digital VTR 1. Recording Format of Digital VTR The format of one track for a digital VTR to which the present invention is applied and the partial enlarged view of the format are presented in FIG. 15 wherein the digital VTR records images in the ITI area, AUDIO area, and VIDEO area in this order from the entrance to the track. (The IBG shown in FIG. 15 stands for an inner block gap.)

Figure 15:
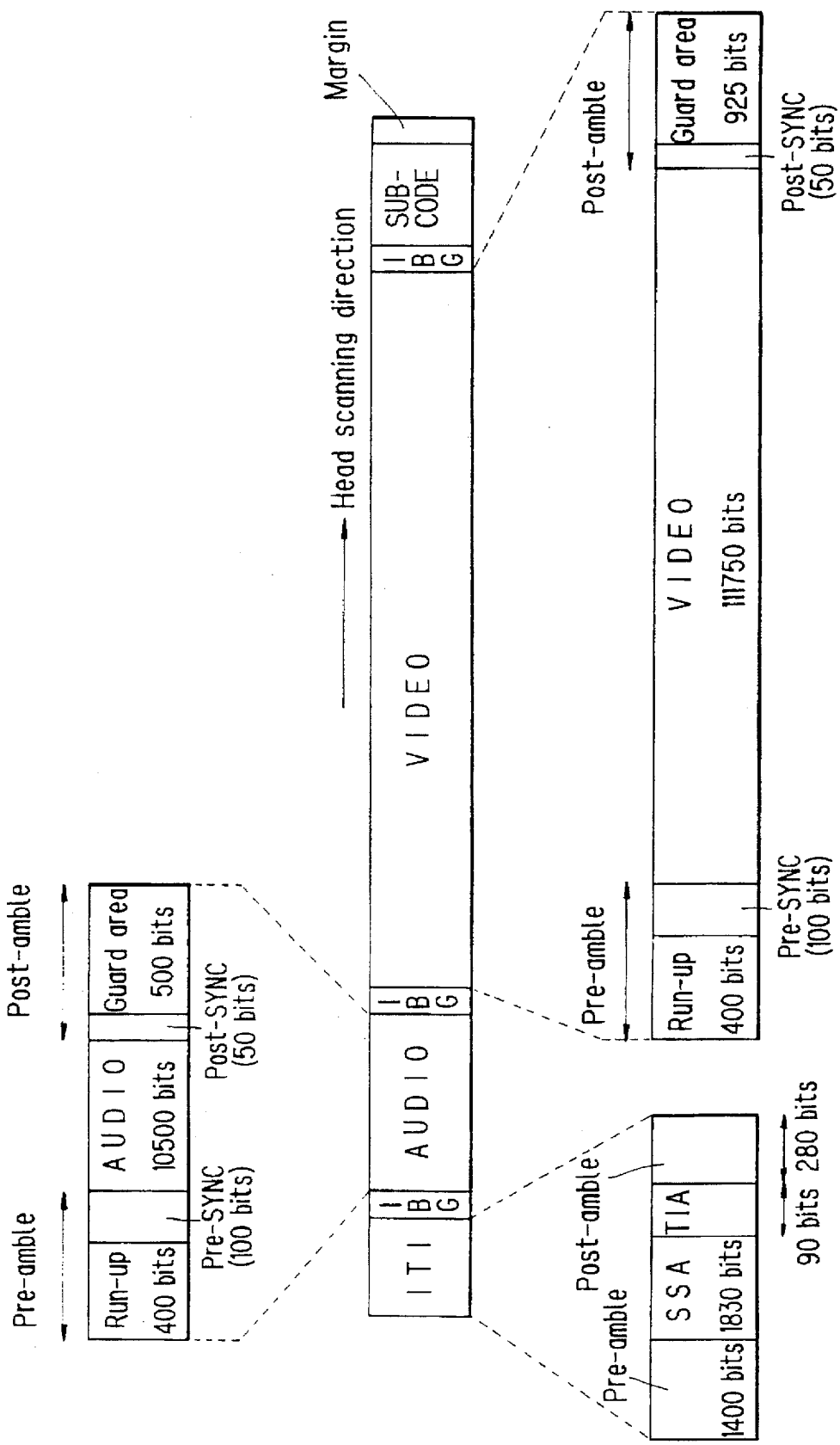
FIG. 15 is a diagram illustrating the format of one track for a digital VTR according to one embodiment of the present invention.

Referring to FIG. 15, the ITI is a timing block for accurate positioning in after-recording. As shown in the partially enlarged view, the ITI consists of a 1400-bit pre-amble for such purposes as PLL run-in in signal reproduction, an SSA used for positioning in after-recording, a TIA containing such data as 3-bit ID data APT defining the structure of data on the track, and a post-amble.

Referring further to FIG. 15, both the AUDIO area and the VIDEO area are provided on their front and rear ends with a pre-amble consisting of a run-up and a pre-SYNC and a post-amble consisting of a post-SYNC and a guard area, respectively. The pre-SYNC consists of two pre-SYNC blocks shown in (1) of FIG. 16 while the post-SYNC consists of one post-SYNC block shown in (2) of FIG. 16. When these 6-byte SYNC blocks are recorded through 24–25 conversion (conversion from 24 bits to 25 bits), pre-SYNC and post-SYNC have the number of bits shown in FIG. 15.

These ambles excluding the areas constitute an audio data recording region consisting of 14 SYNC blocks each having a data length of 90 bytes and a video data recording region consisting of 135 SYNC blocks each having a data length of 90 bytes. When data in these regions are also recorded through 24–25 conversion, these regions have a length of 105000 bits and 111759 bits for audio data and video data, respectively.

Figure 17:
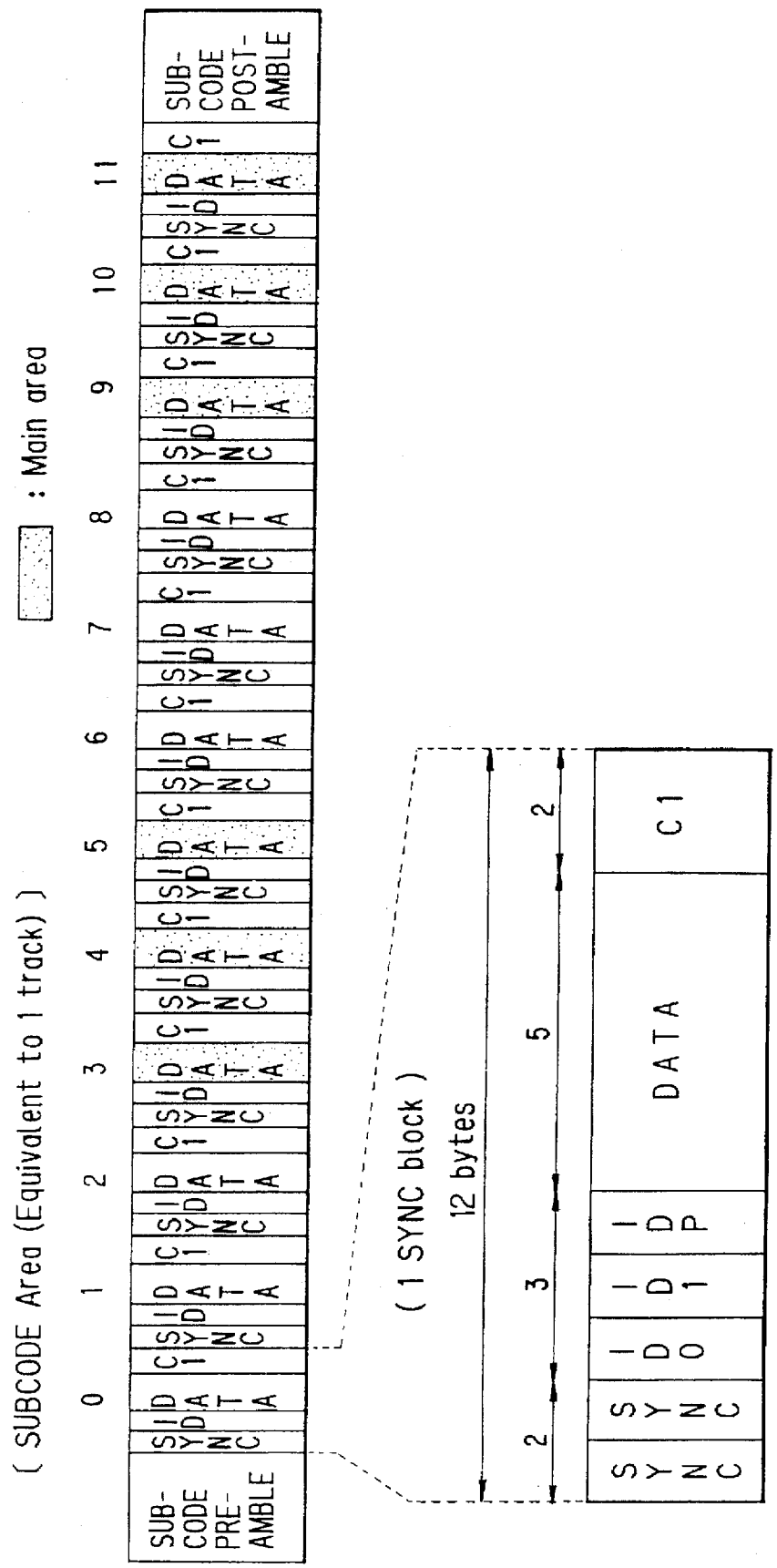
FIG. 17 is a diagram illustrating the configuration of the SUBCODE area on one track.

The SUBCODE area is provided to record mainly information to be searched quickly and its enlarged view is presented in FIG. 17 wherein the SUBCODE area contains 12 SYNC blocks each having a data length of 12 bytes and is provided on its front and rear ends with a pre-amble and a post-amble, respectively. It is to be noted here that the SUBCODE area is not provided with the pre-SYNC and post-SYNC unlike the AUDIO area and the VIDEO area.

2. Signal Processing in Recording System

Processing of audio and video signals constituting main data on the track in the above-mentioned format will now be explained below with reference to FIG. 18.

1) Processing of Audio Signal

An outline procedure for processing signals on the recording side of a digital VTR is presented in FIG. 18 wherein an input audio signal is subjected to A/D conversion by the A/D conversion circuit 1 and time axis compression and other processings by the voice processing circuit 3 to produce audio data, which is framed for each track by the framing circuit 8 together with the AAUX data from the auxiliary data forming circuit 10 for input to the parity generation circuit 11, where the audio data is assigned an error correction sign.

Figure 19A:
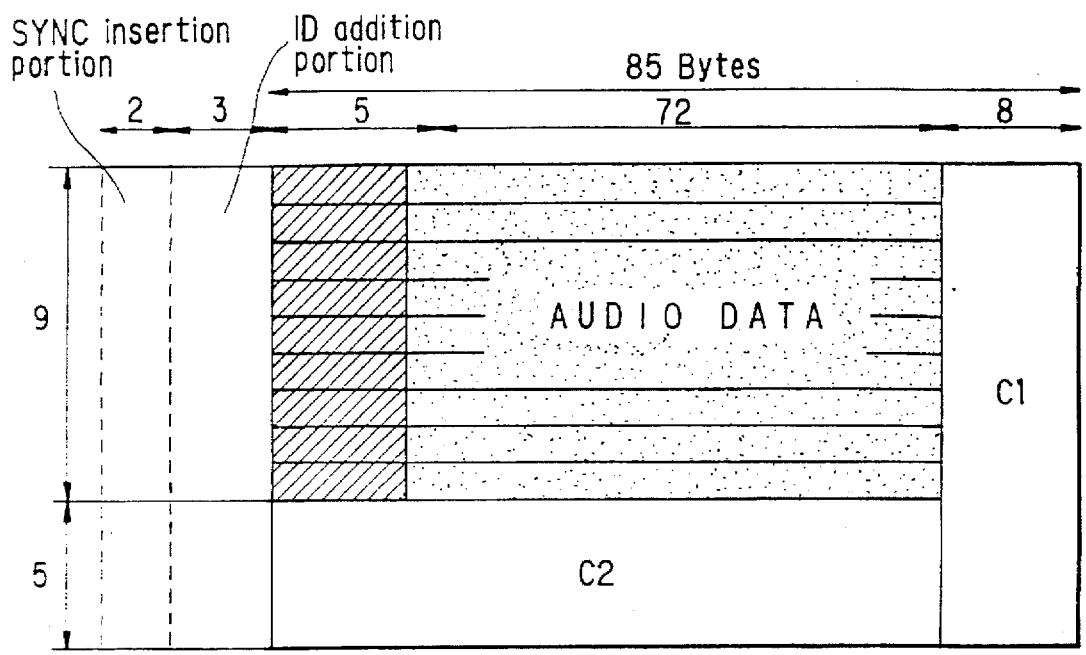
FIGS. 19A–19B are diagrams illustrating the format of audio data in frame form on one track with the addition of an error correction sign and the configuration of 1 SYNC block of audio data.
Figure 19B:
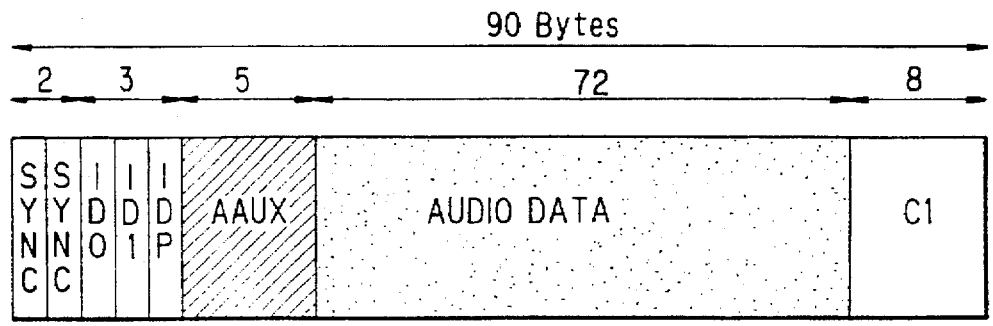

The format of audio data thus framed and assigned parity is presented in (1) of FIG. 19 wherein the data portion consists of 9 blocks vertically disposed each having a data length of 77 bytes, with the audio data being assigned a 8-byte horizontal parity C1 and a vertical parity C2 equivalent to 5 blocks.

Referring now to FIG. 18, the audio signal thus assigned these parities is read in units of blocks for feeding via the switching circuit 14 to the ID addition circuit 15, where it is assigned a 3-byte ID. Further, the recording modulation circuit 16 inserts a 2-byte SYNC signal into the audio signal to generate 1 SYNC block signal with a data length of 90 bytes as shown in (2) of FIG. 19. This signal is recorded on tape via the recording amplifier 17.

2) Processing of Video Signal

Following the processing and recording of the audio signal as mentioned above, a video signal from the parity generation circuit 12 is fed via the switching circuit 14 to the ID addition circuit 15 for recording on tape via the circuits 16 and 17. The processing of this video signal is presented in FIG. 18 wherein a component video signal consisting of Y, R-Y, and B-Y is subjected to A/D conversion by the A/D conversion circuit 2 for feeding to the circuit 4 for blocking and shuffling.

Figure 20A:
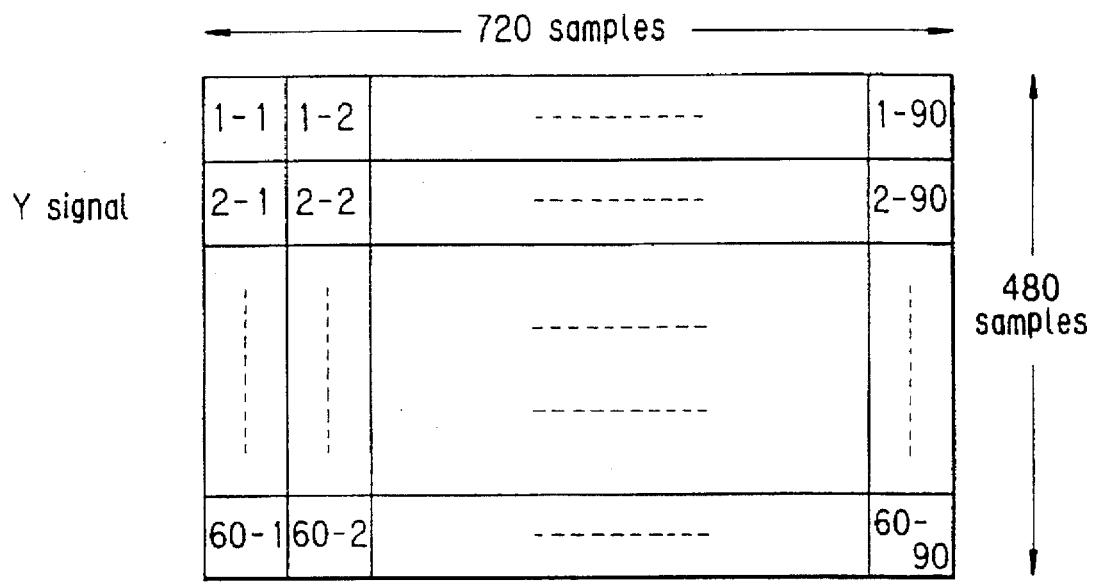
FIGS. 20A–20B are diagrams illustrating a procedure for blocking video data.
Figure 20B:
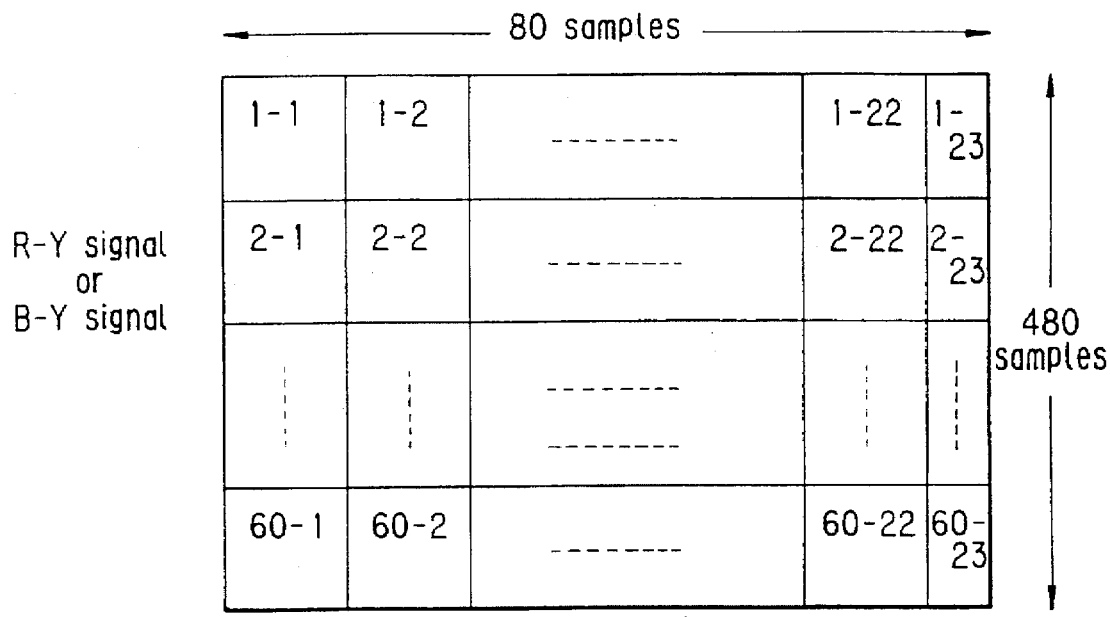

In the circuit 4, data in one frame in a valid scanning region is extracted, for example, for blocking for an NTSC video signal as shown in FIG. 20. With reference to the Y signal, data in one frame consists of 720 horizontal samples and 480 vertical samples, which are blocked into 8 horizontal samples and 8 vertical samples to form a total of 5400 blocks as shown in (1) of FIG. 20.

Similarly, as regards the color-difference signals, data in one frame data consists of 180 horizontal samples and 480 vertical samples, which are blocked into 8 horizontal samples and 8 vertical samples to form a total of 2700 blocks of R-Y and B-Y data as shown in (2) of FIG. 20. Since the right end block of each color difference signal has only 4 horizontal samples, two vertically adjacent 2 blocks are combined into 1 block. This blocking process forms a total of 8100 blocks for each frame for the Y signals and the color-difference signals. Incidentally, each block consisting of 8 horizontal samples and 8 vertical samples is referred to as a DCT block.

Referring further to FIG. 18, the DCT blocks are shuffled in accordance with a predetermined shuffling pattern and then fed to the DCT conversion circuit 5 for DCT conversion in units of blocks. The output of the DCT conversion circuit 5 is quantized by the quantizing circuit 6 and then fed to the variable-length encoding circuit 7 for data compression. The quantizing step in the quantizing circuit 6 is set for each 30 DCT blocks in such a manner that the total amount of output data resulting from quantizing and variable-length encoding of 30 DCT blocks is below a predetermined value. Namely, output data from the variable-length encoding circuit 7 has its length fixed for each 30 DCT blocks. Data in 30 DCT blocks is referred to as a buffering unit.

These steps of shuffling, DCT conversion, quantizing, and variable-length encoding are not described in any more detail herein since they are not directly related to the methods of recording ID signals for retrieving images, retrieving images, and switching the operation of the recorded image reproduction apparatus during reproduction according to the present invention. The data thus fixed in length is framed by the framing circuit 9 for each track together with the VAUX data indicative of auxiliary data from the auxiliary data forming circuit 10 and then fed to the parity generation circuit 12, where the data is assigned an error correction sign.

Figure 21:
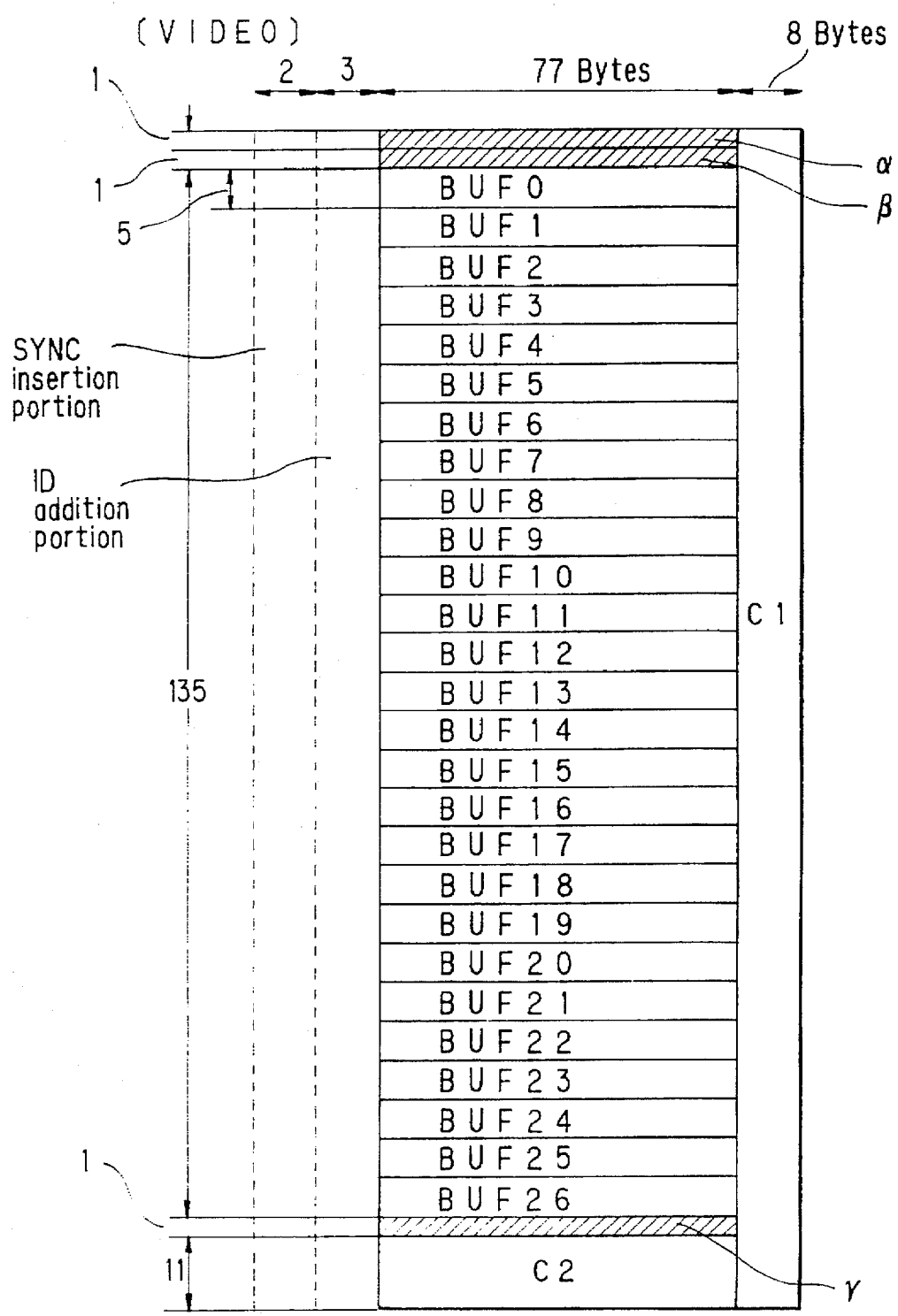
FIG. 21 is a diagram illustrating the format of audio data in frame form on one track with the addition of an error correction sign.

The format of video data thus framed and assigned an error correction sign is presented in (2) of FIG. 21 wherein BUF0 to BUF26 each represent One buffering unit consisting of 5 vertical blocks each having a data length of 77 bytes (namely, one buffering unit has its length fixed to 77×5 bytes).

At the head of each block, data Q (such information as the quantizing step) indicative of a parameter for quantizing by the quantizing circuit 6 is stored for use in decoding during reproduction. As shown in FIG. 21, the 27 buffering units vertically disposed are provided on their top with VAUX data α and β equivalent to 2 blocks in each buffering unit and on their bottom with VAUX data γ equivalent to 1 block, and these framed data are assigned a 8-byte horizontal parity C1 and a vertical parity C2 equivalent to 11 blocks by the parity generation circuit 12.

Referring now to FIG. 18, the video signal thus assigned parities is read in units of blocks for feeding to the ID addition circuit 15, where it is assigned a 3-byte ID signal at the head of each block. Further, the recording modulation circuit 16 inserts a 2-byte SYNC signal into the video signal, thus generating 1 SYNC block signal with a data length of 90 bytes as shown in (2) of FIG. 22 for the blocks of video data and 1 SYNC block signal as shown in (3) of FIG. 22 for the blocks of VAUX data. These 1 SYNC block signals are recorded sequentially on tape via the recording amplifier 17.

In the above-mentioned framing format, 27 buffering units indicative of video data in one track have data equivalent to 810 DCT blocks while video data in one frame (equivalent to 8100 DCT blocks) is recorded separately on 10 tracks.

3. Structure of ID Portion in AUDIO Area and VIDEO Area

The structure of the ID portion in each SYNC block in the AUDIO area and the VIDEO area will now be explained below.

Figure 22A:
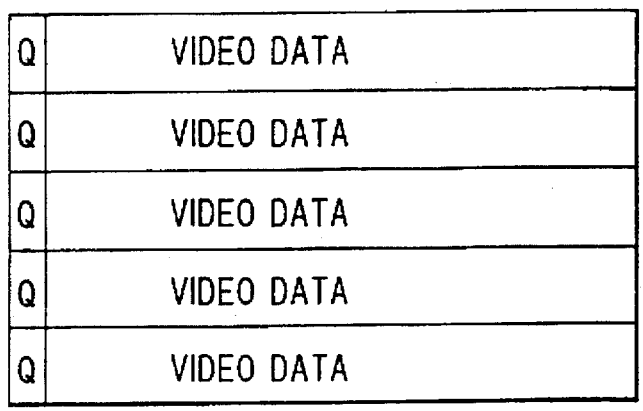
FIGS. 22A–22C are diagrams illustrating the configuration of a buffering unit and the configuration of 1 SYNC block of video data.
Figure 22B:
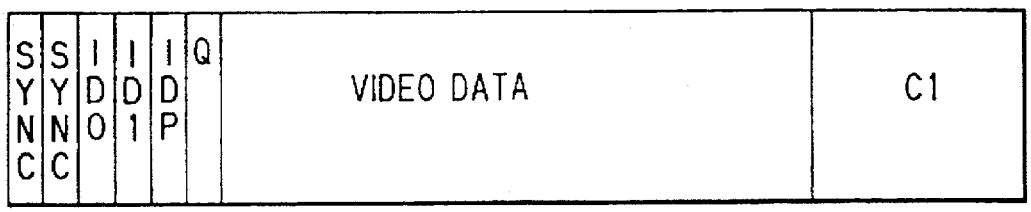
Figure 22C:
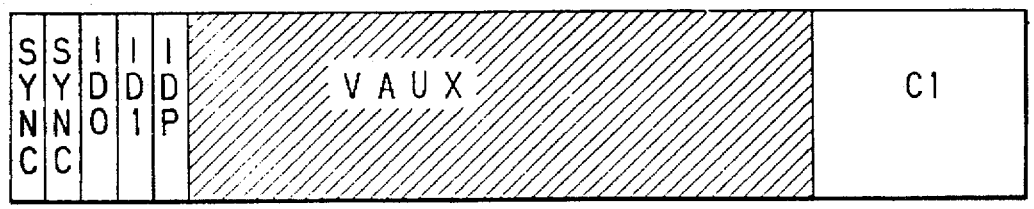

As shown in FIG. 16, FIG. 19, and FIG. 22, the ID portion consists of ID0, ID1, and IDP with a length of 3 bytes, of which IDP acts as a parity protecting ID0 and ID1.

ID0 and ID1 have data contents shown in FIG. 23. Namely, ID0 stores binary SYNC numbers on one track, ranging from pre-SYNC in the AUDIO area to post-SYNC in the VIDEO area. The lower 4 bits of ID0 store track numbers in one frame.

As shown in (1) of FIG. 23, the upper 4 bits of ID0 store 4-bit sequence numbers in SYNC blocks for the AAUX data, AUDIO data, and VIDEO data. As shown in (2) of FIG. 23, the upper 4 bits of ID0 store 3-bit ID data AP1 defining the structure of data in the AUDIO area in the pre-SYNC block, the post-SYNC block, and the SYNC block for C2 parity in the AUDIO area; and 3-bit ID data AP2 defining the structure of data in the VIDEO area in the pre-SYNC block, the post-SYNC block, and the SYNC block for C2 parity in the VIDEO area.

The above-mentioned sequence numbers are 12 numbers ranging from '0000' to '1011' which are recorded for each frame and indicative of whether data obtained during variable-speed reproduction belongs to the same frame.

4. Structure of AAUX Data and VAUX Data

The structure of the AAUX data and the VAUX data, which are recorded in the AUDIO area and the VIDEO area, respectively, will now be explained below. These data are various types of auxiliary data which are to be recorded as an ancillary to video data and audio data and which are converted into a format suitable for recording. Each of these data is structured in units of 5-byte fixed-length blocks (referred to as "packs").

The basic structure of each pack is presented in FIG. 24 wherein the first byte (PC0) is defined as an item data indicative of data contents and succeeded by 4 bytes (Pc1 to PC4) whose format is determined in correspondence with the item data and used as a standard for storing any data. The item data consists of the upper 4-bit major item and the lower 4-bit minor item, the former defining the applications of the succeeding data and other information and the latter defining the contents of the succeeding data and other information. Both these items can be combined to record a maximum of 256 varieties of pack data.

One example of classification of pack by major item is presented in FIG. 25 wherein the major item '0000' expands a pack for recording data relating to the control of the digital VTR while the succeeding major items '0001', '0010', '0011', and '0100' expand packs for recording data relating to the title, chapter, part, and program of recorded images, respectively. Further, the major item '0101' expands a pack mainly for recording data within a vertical blanking period and is suitable for use in commercial application of the digital VTR. Moreover, the major items '0110' and '0111' expand packs for recording video data and audio data, respectively. Lastly, the major item '1111' provides a pack mainly for use by software manufacturers. As an exception, only the pack under the major item '11111111' is treated as indicative of 'no information' in all pack data recording areas.

As described above, the AAUX data and the VAUX data are structured in units of packs. The AAUX data consists of 1 pack in the 5-byte AAUX area in 1 SYNC block for audio data as shown in (2) of FIG. 19 with 9 packs recorded in the AAUX area on one track.

On the other hand, the VAUX data on one track consists of α, β, and γ blocks as shown in FIG. 21 with each block containing 15 packs and one track recording 45 packs. The last 2 bytes of each block are treated as reserved areas.

Figure 26:
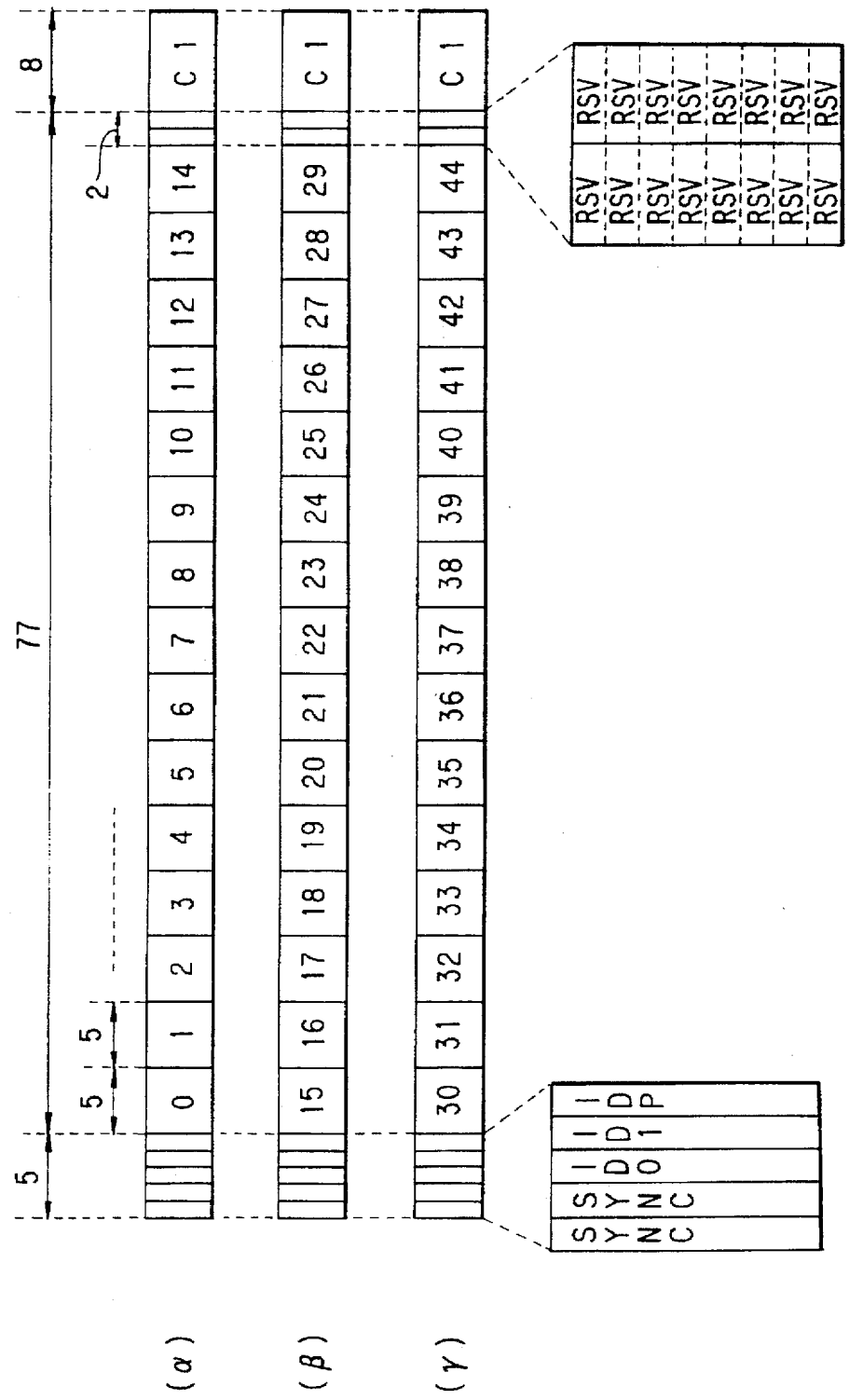
FIG. 26 is a diagram illustrating the configuration of VAUX data on one track.

For reference, VAUX data on 10 tracks in one frame is shown in FIG. 27 wherein one segment corresponds to one pack while pack numbers 0 to 44 correspond to the pack numbers shown in FIG. 26. The packs numbered 60 to 65 are 6 types of packs in the main area which are intended for storing basic data to be supported on any tape. The areas for the other packs are referred to as optional areas, where users can record any desired one selected from the above-mentioned varieties of pack data. The numbers 60 to 66 for the above-mentioned packs in the main area are hexadecimal representations of items in each pack.

The specific structure of each of the packs in the main area will now be explained below with reference to (1) to (5) of FIG. 28. Referring to (1) of FIG. 28, there is illustrated the VAUX SOURCE pack (with a hexadecimal item representation of '60'), in which all the bits of PC1 and the lower 4 bits of PC2 store TV channel numbers of a recording source. In PC2, 'CLF' is a 2-bit code indicative of color framing and allows recording, for example, of four types of color framing phases; 'EN' is a flag indicative of whether 'CLF' is valid or not; 'B/W' is a flag indicative of either white or black signals. In PC3, '50/60' is a flag indicative of field frequencies; 'SOURCE CODE' is a code indicative of source types; 'STYPE' is a code indicative of recording system conditions such as the number of recording tracks per frame on tape.

Referring next to (2) of FIG. 28, there is illustrated the VAUX SOURCE CONTROL pack (with a hexadecimal item representation of '61'). In PC2, 'REC ST' is a flag indicative of recording start points; 'REC MODE' is a code distinguishing between original recording and inserted recording. In PC3, 'BCSYS' is data on such values as aspect ratios; 'FF' is a flag indicative of whether to output only a signal in one field repeatedly into a frame; 'FS' is a flag indicative of odd-numbered fields; 'FC' is a flag indicative of whether video data to be recorded is identical with that one frame ahead; 'IL' is a flag indicative of whether a signal to be recorded is an interlace signal; 'ST' is a flag indicative of whether a signal to be recorded is a static image; 'SC' is a flag indicative of whether an image to be recorded is a static image to be reproduced by bringing tape into a paused state. In PC4, 'GENRE CATEGORY' is a code indicative of the genre of recording.

Referring now to (3) of FIG. 28, there is illustrated the VAUX REC DATE pack (with a hexadecimal item representation of '62'). In PC1, 'DS' is a flag indicative of summer time; 'TM' is a flag indicative of the presence or absence of time-zone differences of 30 minutes; 'TIME ZONE' is a code indicative of time-zone differences. PC2 to PC4 record day, week, month, and year data. Referring then to (4) of FIG. 28, there is illustrated the VAUX REC TIME pack (with a hexadecimal item representation of '63'), which records recording time in accordance with the SMPTE/EBU time codes.

Referring finally to (5) of FIG. 28, there is illustrated the VAUX REC TIME BINARY GROUP pack (with a hexadecimal item representation of '64'), which records binary data on recording time in accordance with the above-mentioned SMPTE/EBU time codes. In addition, there is also provided a code with a hexadecimal item representation of '65', which records closed caption information. The specific structure of this pack will not be explained here. The above-mentioned packs in the main area record the same data ten times in one frame with their recording positions varying in the vertical direction for each track, thereby enhancing the possibility of their being read despite such troubles as damage to tape and clogging of either one channel in the head.

5. Structure of Subcode Data

The recording of audio data and video data as mentioned above is followed by the recording of subcode data formed by the auxiliary data forming circuit 10 shown in FIG. 18. This subcode data will now be explained below with reference to the structure of its data portion and ID portion, the subcode signal generation circuit, and the subcode data reproduction circuit in this order.

1) Structure of Data Portion

Referring to FIG. 17, 5-byte subcode data is written in each one of SYNC blocks 0 to 11 to constitute one pack. Namely, 12 packs are recorded on one track, with the packs 3 to 5 and 9 to 11 constituting the main area and the remaining packs constituting the optional area.

Referring to FIG. 29, data contents recorded in the main area are defined as different on the former 5 tracks from on the latter 5 tracks in one frame, with the former containing the TITLE TIME CODE (TTC) pack (shown in FIG. 30) indicative of the recording position of the title of recording or the TITLE TILE CODE BINARY GROUP (BIN) pack and the latter containing the REC DATE pack and the REC TIME pack in addition to the TTC pack.

In these packs, the same data are recorded repeatedly on the former 5 tracks and the latter 5 tracks and in the SYNC blocks 3 to 5 and 9 to 11 alternately on the same track. Further, the same data are also recorded repeatedly in the optional area. This repetitive recording in one frame is presented in FIG. 31 wherein 'A' and 'C' represent TTC data; 'B' represents TTC or BIN data; 'D' represents REC DATE data; 'E' represents REC TIME data. It is to be noted here that the same TTC data is represented by different symbols 'A' and 'C' because 'C' includes the CHAPTER START pack data indicative of the start of chapters on soft tape.

Referring further to FIG. 31, 'a', 'b', 'c', ---, 'k', and 'm' represent pack data in the optional area, where 6 pack data on one track are recorded five times repeatedly on the former 5 tracks and the 5 tracks in one frame, with their recording positions being arranged in such a manner that pack data with SYNC block numbers 0 to 2 alternate with those with SYNC block numbers 6 to 8 for every one track.

While the above-mentioned recording pattern applies to the recording of NTSC video signals, the recording pattern of subcode data in one frame for use in the recording of PAL video signals is presented for reference in FIG. 32 wherein one frame consists of 12 tracks, each having subcode data consisting of 12 SYNC blocks in the PAL system. The PAL system has the same repetitive recording pattern as the main area and the data in the main area and the optional area.

Referring to FIG. 17, since each subcode data is assigned only horizontal parity with a short length of only 2 bytes and not any vertical parity, subcode data is provided with smaller parity protection than audio data or video data. As explained earlier, however, the subcode data are recorded repeatedly on each track, thus enhancing the possibility of their being read despite clogging of either one channel in the head and also improving their reproduction reliability through use of a majority discrimination method during reproduction. Further, subcode data are designed to be recorded repeatedly at different positions on one track, thus enhancing the possibility of their being read despite damage to tape.

2) Structure of Portion

The structure of the ID portion of subcode data on one track is presented in FIG. 33 wherein the uppermost bit of ID0 is provided with the FR flag indicative of the former 5 tracks in one frame, taking the values of '0' for the former 5 tracks and '1' for the latter 5 tracks; the succeeding 3 bits contain ID data AP3 defining the structure of data in the subcode area in SYNC blocks with SYNC block numbers '0' and '6'; all the other SYNC blocks contain TAG codes, except the SYNC block with the SYNC block number '11', which is treated as a reserved area.

Referring further to FIG. 33, one TAG code consists of 3 types of ID signals for search: INDEX ID, SKIP ID, and PP ID (PHOTO/PICTURE ID) as shown by its enlarged view. The lower 4 bits of ID0 and the upper 4 bits of ID1 are used to record absolute track numbers (serial track numbers starting from the beginning of tape). As shown in FIG. 33, absolute track numbers are recorded in 3 SYNC blocks with a total length of 24 bits. The lower 4 bits of ID1 are used to record SYNC block numbers in the subcode area. IDP is protection parity for ID0 and ID1.

Various advantages offered by the above-mentioned structure of the subcode data will be enumerated below: 1. Facilitating search Short SYNC block length allows a multitude of recording of data in subcodes on one track and repetitive recording of data on the former 5 tracks and the latter 5 tracks in one frame. Further, protection of the data portion by only horizontal parity with no product symbol enables rapid reading and discrimination of data, which, in turn, realizes search speeds in the order of up to 200 times higher.

In particular, search can be made only from the data of the first 5 bytes in each SYNC block (SYNC and ID portions) by using PP ID, INDEX ID, and other ID signals contained in TAG data of the ID portion or using absolute track numbers. Further, REC DATE data and REC TIME data recorded on the latter 5 tracks in one frame can also be used to make search from recording years, months, and dates or recording hours, minutes, and seconds.

Moreover, it is also possible to make various types of search based on data recorded in any necessary pack selected from many types of packs and written in the optional area.

2. Facilitating rewriting of the data portion Since REC DATE data and REC TIME data with a high possibility of rewriting are recorded only on the latter 5 tracks in one frame, these data can be rewritten easily by following a procedure shown in FIG. 34.

Figure 34:
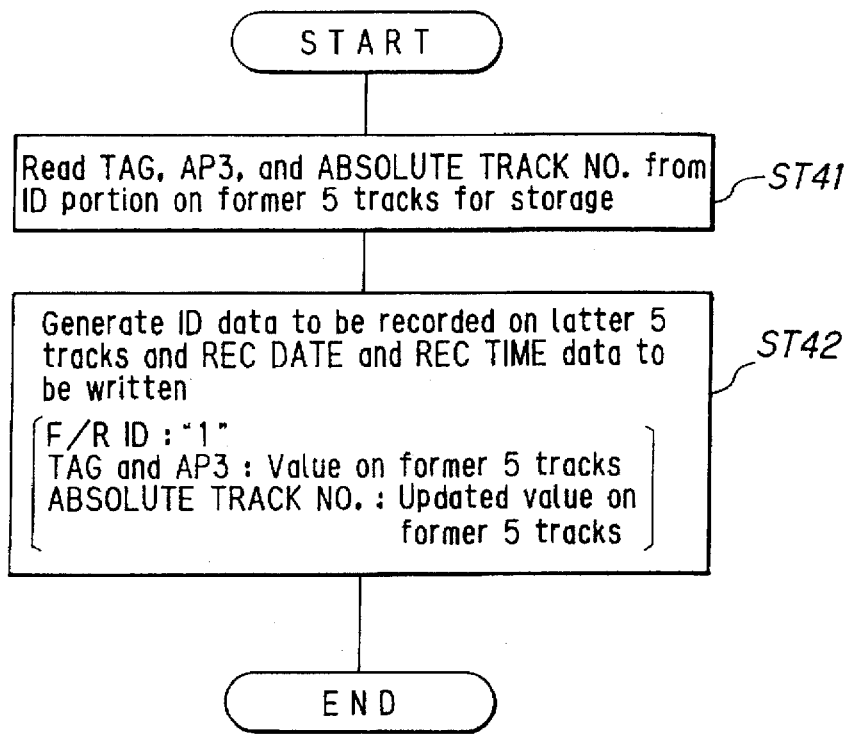
FIG. 34 is a flow chart illustrating a procedure for rewriting REC DATE and REC TIME in the SUBCODE area.

Referring to FIG. 34, there are provided the step ST41 wherein AP3, TAG, and ABSOLUTE TRACK NO. are read from the ID portion on the former 5 tracks in a frame to be rewritten for storage in the memory and the step ST42 wherein tape is run to rewrite (record) subcode data on the latter 5 tracks. The data thus recorded is '1' for the FR flag and the above-mentioned data stored in the memory for AP3 and TAG. For ABSOLUTE TRACK NO., the last track number stored in the memory is updated for every one track. These data are used together with new SYNC block numbers to be recorded to calculate new IDP to be recorded. Desired REC DATE data and REC TIME data are recorded in the data portion.

Thus, any subcode data to be rewritten is recorded on the latter tracks in one frame, making it easy to preserve data in the ID portion in rewriting the subcode data. On the contrary, when a recording format is used in which the same subcode data is recorded on the former tracks and the latter tracks in one frame, any attempt to rewrite the subcode data involves rewriting all subcode data on all the tracks in one frame, making it difficult to preserve data in the ID portion.

3. Possibility of processing using FR flag

In an ordinary reproduction process, any pack data will be discarded if rendered impossible to decipher due to error occurrence. In the subcode area, however, the same pack data is recorded five times repeatedly on the former 5 tracks and the latter 5 tracks in one frame. Consequently, any pack data to be discarded due to error occurrence, for example, in the main area could be recovered by another pack data if it were reproduced correctly at the same position on any other tracks of the same 5 tracks. At this time, it can be judged from the FR flag immediately whether another pack data belongs to the same 5 tracks or not.

Further, when ID signals for search, such as INDEX ID, are subsequently implanted in the subcode area, this recording process starts with the first track in a desired free. At this time, too, the first track can be identified easily by locating a point where the FR flag value changes from '1' to '0'. Another example of such application of the FR flag to locating a framing start point can be found in variable-speed reproduction. The operation and specific structure in this case will now be explained below.

Figure 35:
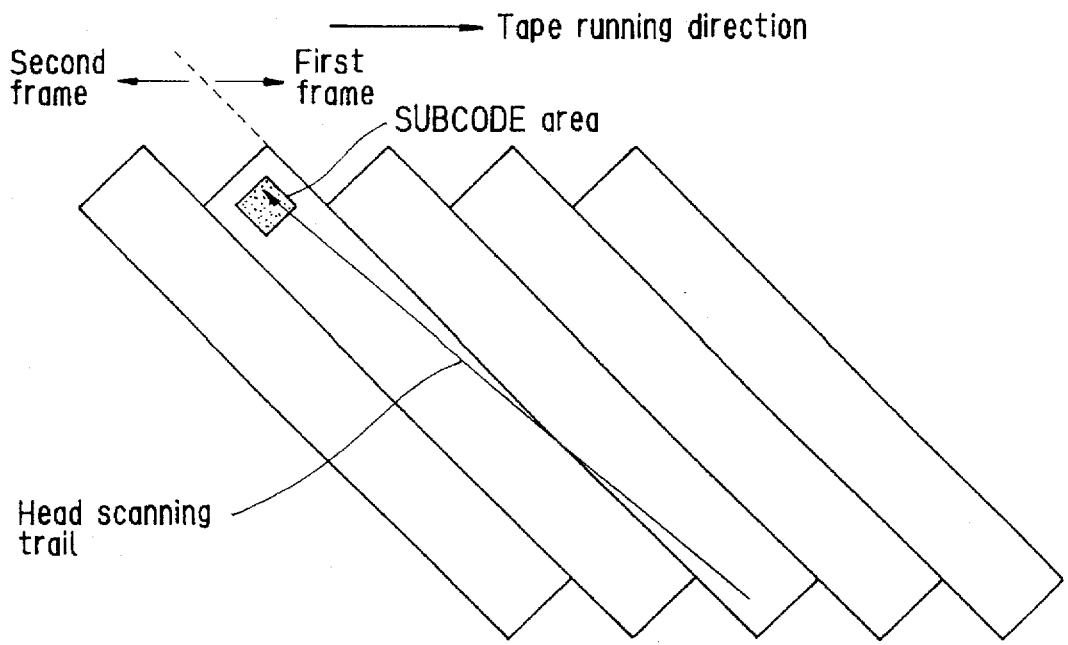
FIG. 35 is a diagram illustrating the scanning trail of the head during slow reproduction.

One example of operation in the case of variable-speed reproduction is presented in FIG. 35 which illustrates the scanning trail of the head during reproduction with slightly higher tape running speeds than usual. As shown in FIG. 35, when the head scans the vicinity of a frame boundary in the above-mentioned reproduction process, there may occur a lag of one frame in any read audio data or video data relative to any read subcode data. Consequently, when search is made based on the contents of subcode data, any image searched from any read subcode data may be displayed with a lag of one frame.

Figure 36:
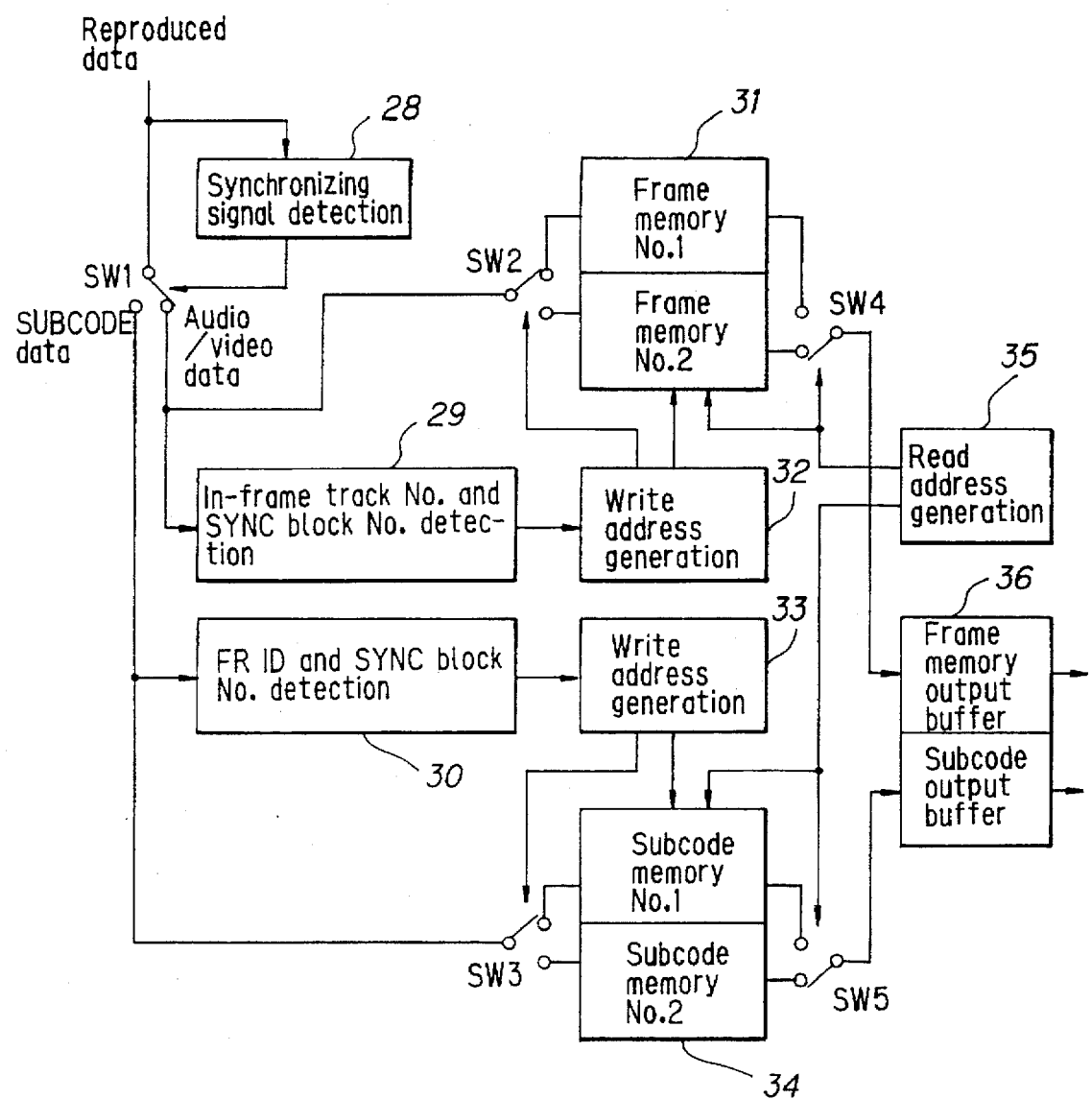
FIG. 36 is a diagram illustrating one example of a reproduction circuit suitable for slow reproduction.

To solve this problem a circuit as shown in FIG. 36 may be used to ensure that there is always a frame match between subcode data and audio or video data being displayed. Referring to FIG. 36, reproduced data read by the head and decoded on channels is fed to the synchronizing signal detection circuit 28, whose output is used to control the switch SW1 to separate subcode data from audio or video data. The synchronizing signal detection circuit 28 identifies the subcode area on the basis of the count output of synchronizing signals as well as their pattern detection by taking advantage of the differences in their sign configuration between the subcode area and the audio or video area and then switches the SW1 according to how the subcode area is identified.

The audio or video data thus separated from the subcode data is fed to the storage unit 31 and the detection circuit 29. The detection circuit 29 detects in-frame track numbers and SYNC block numbers from its data portion and supplies a detection signal to write address generation circuit 32, which in turn generates a write address that is stored in storage unit 31. The storage unit 31 consists of the frame memory No. 1 and the frame memory No. 2, which are used alternately depending on the frame of input data.

On the other hand, the subcode data thus separated from the audio or video data is fed to the storage unit 34 and the detection circuit 30. The storage unit 34 consists of the subcode memory No. 1 and the subcode memory No. 2 each having a storage capacity for subcode data in one frame. The detection circuit 30 detects the FR flag value and SYNC block numbers and supplies a detection signal to write address generation circuit 33, which in turn generates a write address that is stored in each subcode memory. At this time, the detection circuit 30 identifies a frame start point by locating a point where the FR flag value changes from '1' to '0' and then controls the SW3 to switch the subcode memory for storing the subcode data.

The above-mentioned circuit configuration serves to prevent subcode data in two frames from mingling in one frame memory.

Thus, reference address signals from the read address generation circuit 35 are used to read audio or video data and subcode data from the memories associated with the storage units 31 and 34, respectively for feeding to the buffer circuit 36, thereby ensuring that there is always a frame match between audio or video data and subcode data being displayed.

The above-mentioned example of operation allows processing of subcode signals only according to the judgment of the FR flag, one of subcode signals, and therefore has the advantage of facilitating the design of dedicated integrated circuits and other means for processing subcode signals. Further, another application of the FR flag can also be made to judge whether recorded signals are NTSC signals or PAL signals.

More specifically, recorded signals in the digital VTR are recorded sequentially from the first track in each frame by using two heads A and B with different azimuths alternately for every one track. In this event, any signals on the first track in the latter ½ frame are recorded by the head B in the NTSC system with 10 tracks in one frame but read by the head A in the PAL system with 12 tracks in one frame. Consequently, the FR flag can be used to detect the signals on the first track in the latter ½ frame and identify whether they are recorded by the head A or B, thereby judging whether the recorded signals are NTSC signals or PAL signals.

3) Subcode Signal Generation Circuit and Subcode Data Reproduction Circuit

Following the above description of the subcode format, the specific structure of the subcode signal generation circuit in the recording system and the subcode data reproduction circuit in the reproduction system will now be explained below.

i) Subcode Signal Generation Circuit

The structure of the subcode signal generation circuit will now be explained with reference to FIG. 37.

Figure 37:
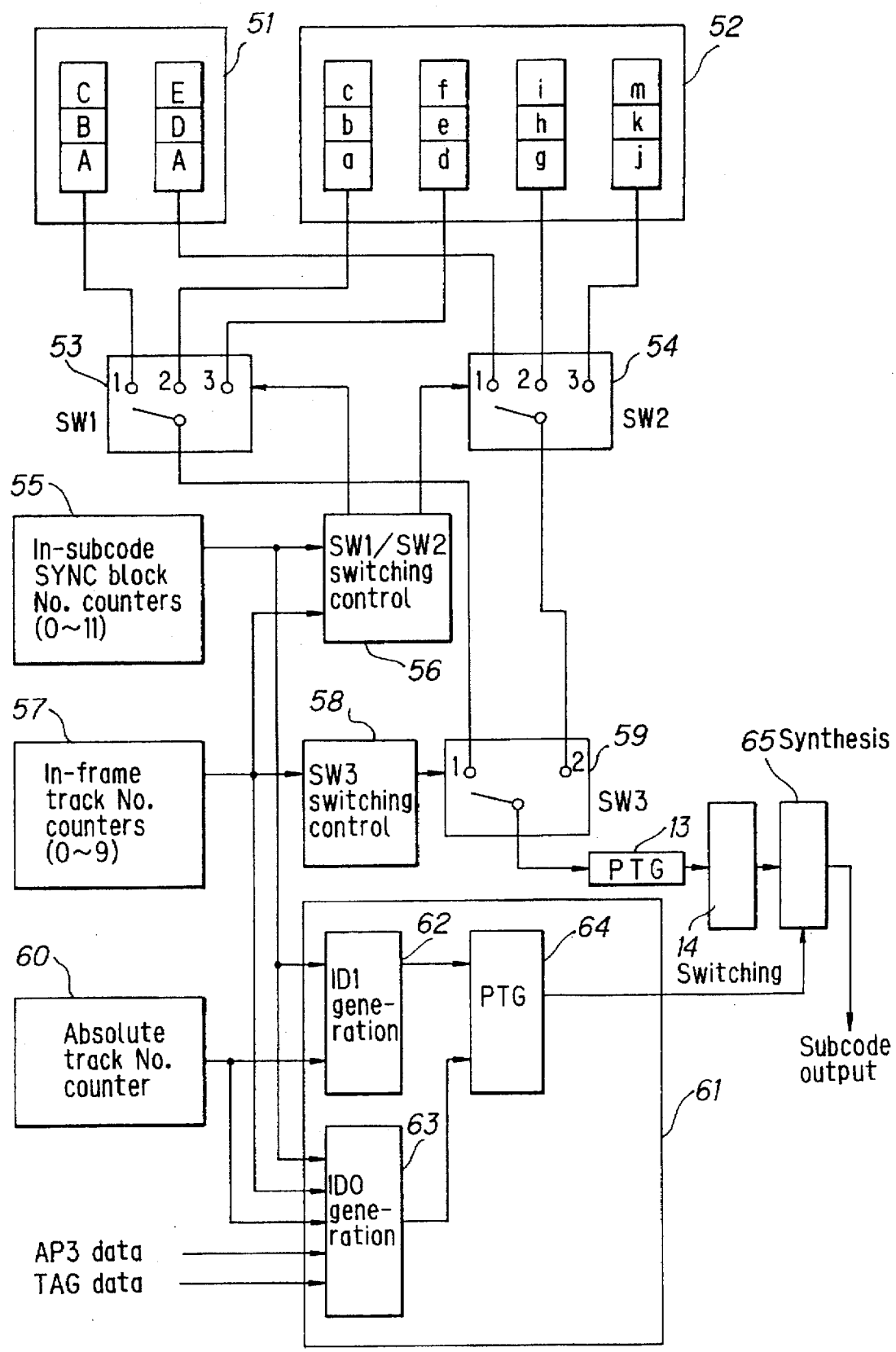
FIG. 37 is a diagram illustrating one example of a subcode signal generation circuit.

Referring to FIG. 37, there are shown the main area pack data storage unit 51 and the optional area pack data storage unit 52, whose internal memories store pack data 'A' to 'E' and 'a' to 'm' (shown in FIG. 31), respectively.

The pack data stored in these memories is fed via the SW1 or SW2 to the SW3. The movable terminals of the SW1 and SW2 are switched by the switching control unit 56 in accordance with the in-subcode SYNC block number counter 55 and the in-frame track number counter 57 in such a manner as to connect with the input terminals 1 to 3 with the timing shown in FIG. 38, thereby causing the SW1 and SW2 output the pack data on the former 5 tracks and the latter 5 tracks in one frame, respectively.

These pack data on the former 5 tracks and the latter 5 tracks in one frame are fed to the SW3 controlled by the switch control unit 58 for alternate output (the relationship between track numbers and the input terminals 1 and 2 connecting with the movable terminals of the SW3 is shown in FIG. 39) and assigned horizontal parity by the parity generation circuit 13 (equivalent to the parity generation circuit 13 in FIG. 18).

On the other hand, the ID1 generation circuit 62 in the ID generation circuit 61 generates ID1 when fed with the outputs of the in-subcode SYNC block number counter 55 and the absolute track number counter 60. Similarly, the ID0 generation circuit 63 generates ID0 when fed with the outputs of the in-subcode SYNC block number counter 55 and the in-frame track number counter 57 (these outputs are used to generate the FR flag), the output of the absolute track number counter 60, as well as AP3 data and TAG data. The ID0 and ID1 thus generated are fed to the parity generation circuit 64, where they are assigned IDP to generate ID signals.

These ID signals are synthesized with data fed from the parity generation circuit 13 via the switching circuit 14 (equivalent to the switching circuit 14 in FIG. 18) in the synthesizing circuit 65 and then subjected to recording modulation and SYNC signal insertion to generate 1 subcode SYNC block signal. It is to be noted here that the ID generation circuit 61 and the synthesizing circuit 65 in FIG. 37 are arranged in the ID addition circuit 15 in FIG. 18.

ii) Subcode Data Reproduction Circuit

The structure of the subcode data reproduction circuit will now be explained with reference to FIG. 40.

Figure 40:
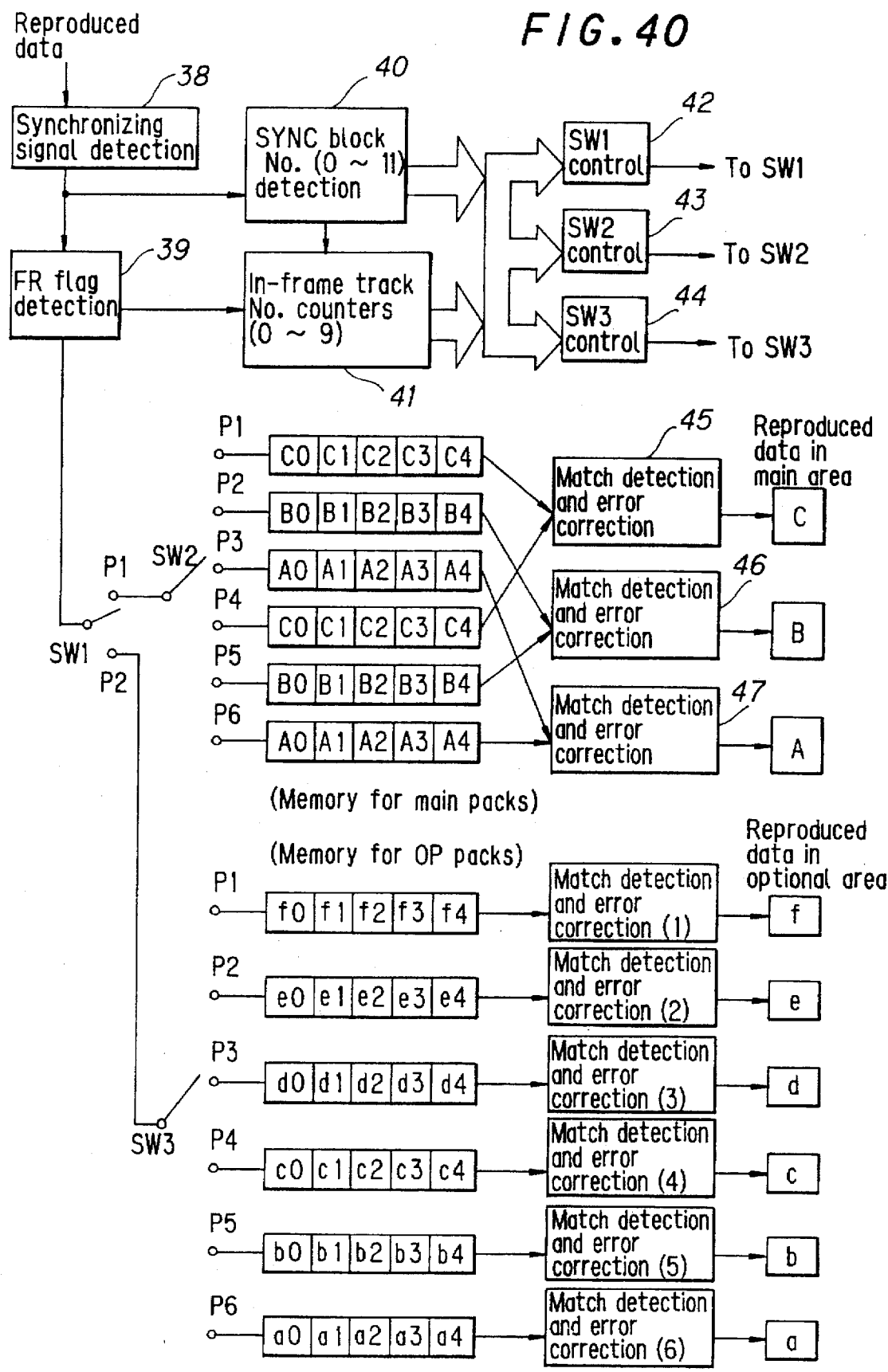
FIG. 40 is a diagram illustrating one example of a subcode data reproduction circuit.

Referring to FIG. 40, reproduced subcode signals are first fed to the synchronizing signal detection circuit 38, whose output is used by the detection circuit 40 to detect SYNC block numbers from ID1 of the subcode signals. Then, the subcode signals are input to the detection circuit 39, which detects a frame start point. Based on the output of the detection circuit 40, the in-frame track number counter 41 counts, for example, every SYNC block number '0' detected, and this count operation is reset by the output of the detection circuit 39 at the frame start point, thereby outputting track numbers.

Further, subcode data from the detection circuit 39 is fed via the switches SW1 and SW2 to the six input terminals P1 to P6 of the main pack memory each having a storage capacity for 5 pack data and fed via the SW1 and SW3 to the six input terminals P1 to P6 of the optional pack memory each having a storage capacity for 5 pack data.

Based on the output of the detection circuit 40, the SW1 control circuit 42 switches the SW1 in such a manner that is shown in (1) of FIG. 41, thereby separating pack data in the main area from that in the optional area. Similarly, the SW2 control circuit 43 operates in response to the output of the detection circuit 40 to switch the SW2 in such a manner that is shown in (2) of FIG. 41, thereby storing only the same type of pack data in the main area in each memory. Further, the SW3 control circuit 44 operates in response to the output of the track number counter 41 and the detection circuit 40 to switch the SW3 depending on whether SYNC block numbers and track numbers are odd or even as shown in (3) of FIG. 41, thereby storing the same type of pack data in the optional area in each memory.

These pack data thus stored are fed to the match detection and error correction circuits 45 to 47 and 1 to 6, which makes majority discrimination for every 10 pack data in the main area and every 5 pack data in the optional area, thus outputting pack data A to C and a to f as reproduced data, respectively. On tape carrying the same TTC pack data for the pack data A and C, majority discrimination can be made for 20 pack data including these pack data in combination. A procedure for such majority discrimination for pack data will now be explained below with reference to FIG. 42.

Figure 42:
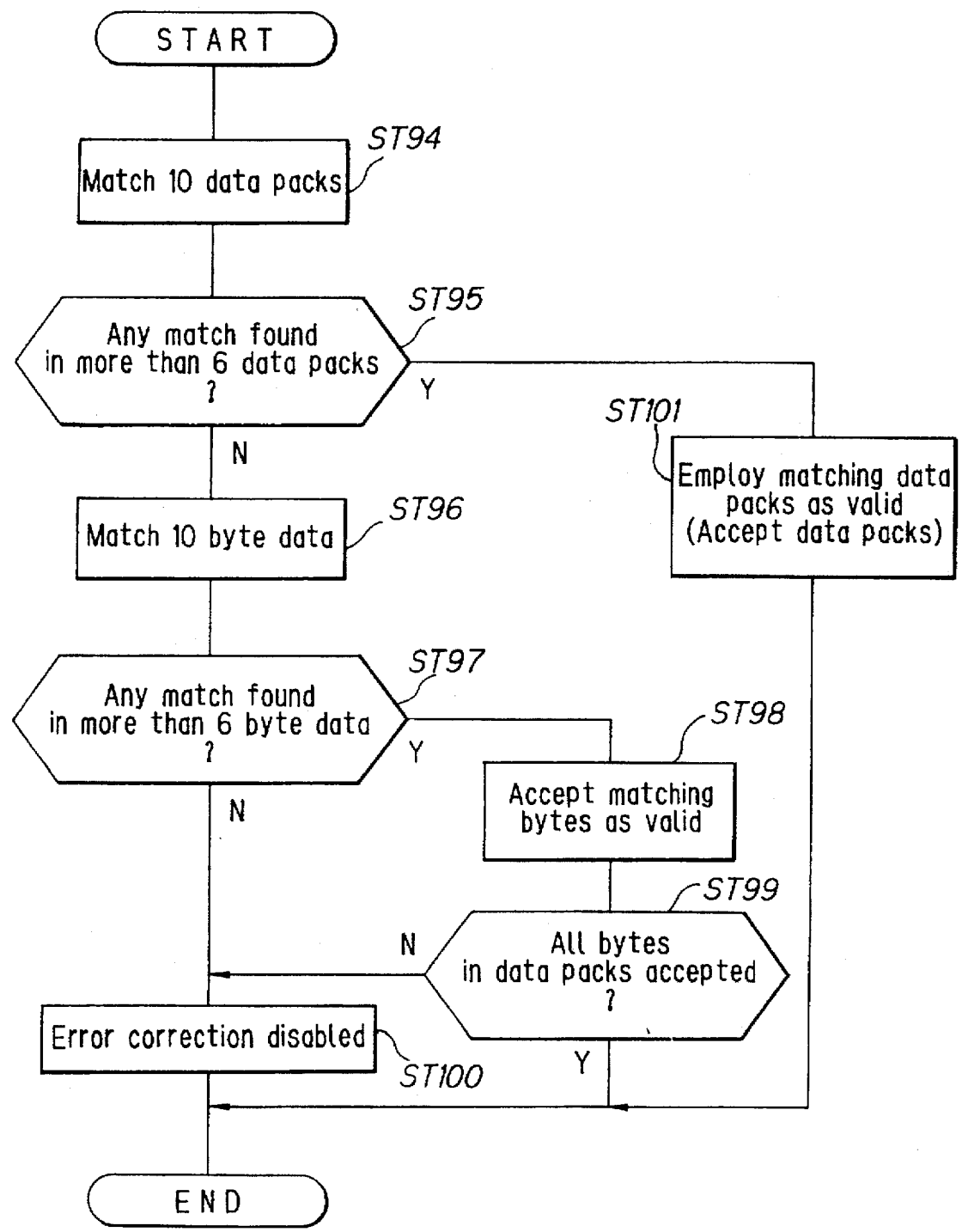
FIG. 42 is a diagram illustrating one example of a method of majority discrimination for pack data.

Referring to FIG. 42, there is shown a flow chart illustrating a procedure for majority discrimination for 10 reproduced pack data in the main area. First, the same type of 10 pack data are matched with one another (in the step ST94). As a result, if a match is found in all 5-byte data in more than 6 packs, the matching pack data will be accepted as valid (in the steps ST95 and ST101). On the other hand, if a match is found in less than 5 packs, the 10 pack data will be matched in units of bytes, and if a match is found in all 5-byte data in more than 6 packs, the matching pack data will be accepted as valid (in the steps ST96 to ST99).

If no match is found in any one 5-byte data in more than 6 packs, the unmatching pack data will be discarded as invalid for error correction (in the steps ST99, ST100, etc.). Similar majority discrimination can also be applied to reproduced pack data in the optional area with the matching requirements set, for example, to 3 packs. Incidentally, if no match is found in an enough number of bytes to constitute any one valid pack data, the above-explained procedure may be reconfigured in such a manner as to make majority discrimination for pack data more minutely in units of bits instead of bytes.

6. Retrieval and Search of Static Images

According to one embodiment of the present invention, static images can be retrieved and searched in a digital VTR with the above-mentioned format by using multiple types of ID signals for search. The method of retrieval and search of static images according to one embodiment of the present invention will now be explained below.

First, the types of static image recording and the types of ID signals will now be explained below.

1) Type of Static Image Recording

According to one embodiment of the present invention, a digital VTR is configured in such a manner as to allow not only ordinary dynamic image recording but also the following four types of static image recording.

1. Snap Recording

Snap recording is a type of recording in which one frame image signal is recorded on tape repeatedly for the duration of several seconds. Both image and voice signals are recorded in the same manner as in ordinary dynamic image recording. Recorded static images are also reproduced in the same manner as in ordinary dynamic image recording.

2. Strobe Recording

Strobe recording is a type of recording in which one frame image signal is extracted from every several frames and recorded on tape repeatedly until the next frame image signal is extracted. Image signals are recorded in the same manner as in ordinary dynamic image recording. Recorded static images are also reproduced stroboscopically in the same manner as in ordinary dynamic image recording. Voice signals are also recorded and reproduced in the same manner as in ordinary dynamic image recording.

3. Single-shot Recording

Single-shot recording is a type of recording in which one frame image signal is recorded on tape repeatedly a predetermined number of times by using a digital VTR for similar applications to still cameras. In reproduction, recorded image signals are read repeatedly from the image memory to display recorded static images. While recordings are on display, tape is kept in a stopped state.

4. Single-shot Successive Recording

Single-shot successive recording is a succession of multiple single-shot recordings in which different types of static images are recorded on tape in succession.

2) Types of ID Signals for Search

According to one embodiment of the present invention, specific static images can be retrieved for search or printout on tape carrying a mixture of ordinary dynamic images and various static images mentioned above by using the above-mentioned PP ID, FC, ST, SC, and INDEX ID signals. These ID signals will now be explained in detail below.

1. PP ID (PHOTO/PICTURE ID) Signal

The PP ID signal is automatically recorded on the TAG subcode when any static images are recorded on tape in an digital VTR and indicative of their recording range on the tape. The PP ID signal is configured in such a manner as to be recorded for the duration of at least 5 seconds. Therefore, when snap recording of a video signal lasts for the duration of less than 5 seconds as shown in (1) of FIG. 43, for example, the PP ID signal will continue to be recorded for the duration of the succeeding dynamic image.

Figure 43A:
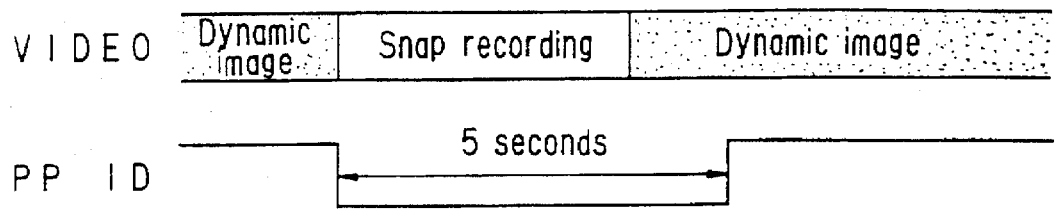
FIGS. 43A–43C are diagrams illustrating the recorded state of the PP ID signal.
Figure 43B:
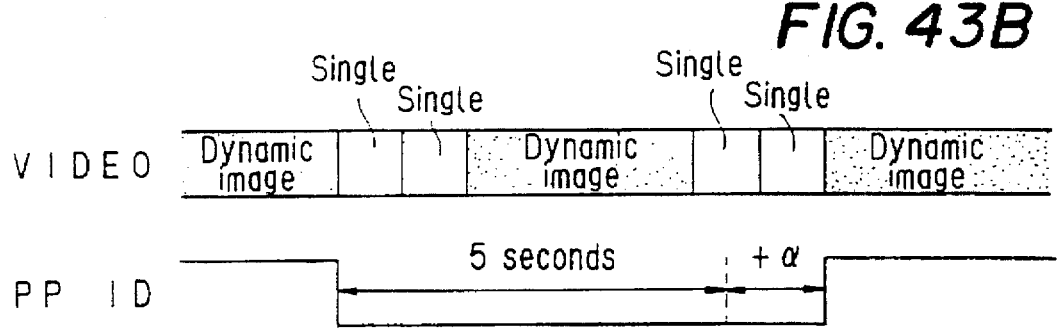
Figure 43C:
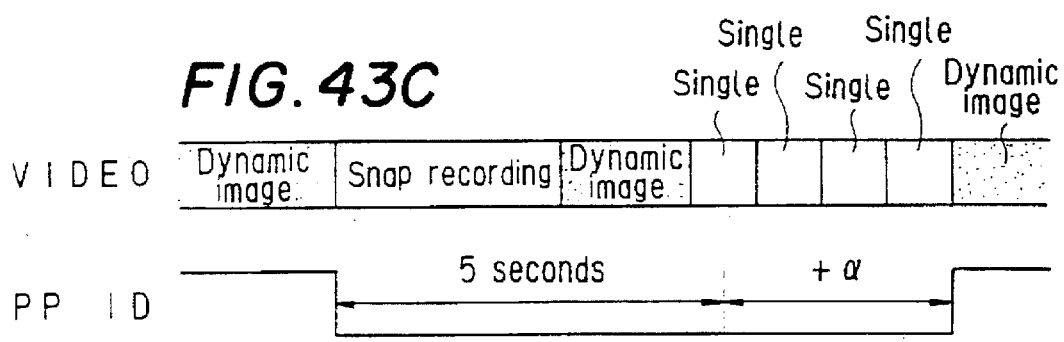

On the contrary, when a static image is recorded for the duration of more than 5 seconds, the PP ID signal will continue to be recorded until the completion of recording of the static image as shown in (2) and (3) of FIG. 43 (the 'single' in this drawing represents a single-shot recording. The PP ID signal will not be affected by any dynamic image that may be inserted in its duration of 5 seconds). According to one embodiment of the present invention, the PP ID signal is recorded for such a long period that any recorded static images can be retrieved with quick search.

The configuration of the PP ID signal generation circuit is illustrated in (1) of FIG. 44.

The operation of the PP ID signal generation circuit will now be described below with reference to (1) of FIG. 44. First, the flip-flop (FF) 24 and the 5-second (TM) 23 are both configured in such a manner as to be reset upon power-on of the digital VTR (at this time the PP ID signal is held high). Then, when the recording mode setting unit 20 is operated, any one of the snap recording mode signal, the strobe recording mode signal, and the single-shot recording mode signal is turned on (driven high) and supplied to AND circuit 22 through OR circuit 21 to start recording operation (at this time the recording operation signal is driven high), whereupon the output of the AND circuit 22 is driven high, thus setting the FF 24 with its PP ID signal output terminal being driven low (to output the PP ID signal indicative of static image recording status) and the TM 23 starting to count time.

The TM 23 is designed to produce high outputs upon counting 5 seconds, whereby the output of the AND circuit 25 makes a lot to high transition only when the TM 23 counts more than 5 seconds and when the output of the AND circuit 22 is held low (namely not at static image recording status), thus resetting the FF 24 with its PP ID signal output terminal being driven high. When the FF 24 is thus reset, the TM 23 is also reset to prepare for the next procedure for static image recording. It is to be noted here that the PP ID signal is subsequently implanted on tape when used to retrieve one specific frame image (corresponding to one specific static image) in dynamic images.

2. FC (FRAME CHANGE) Signal

Figure 1:
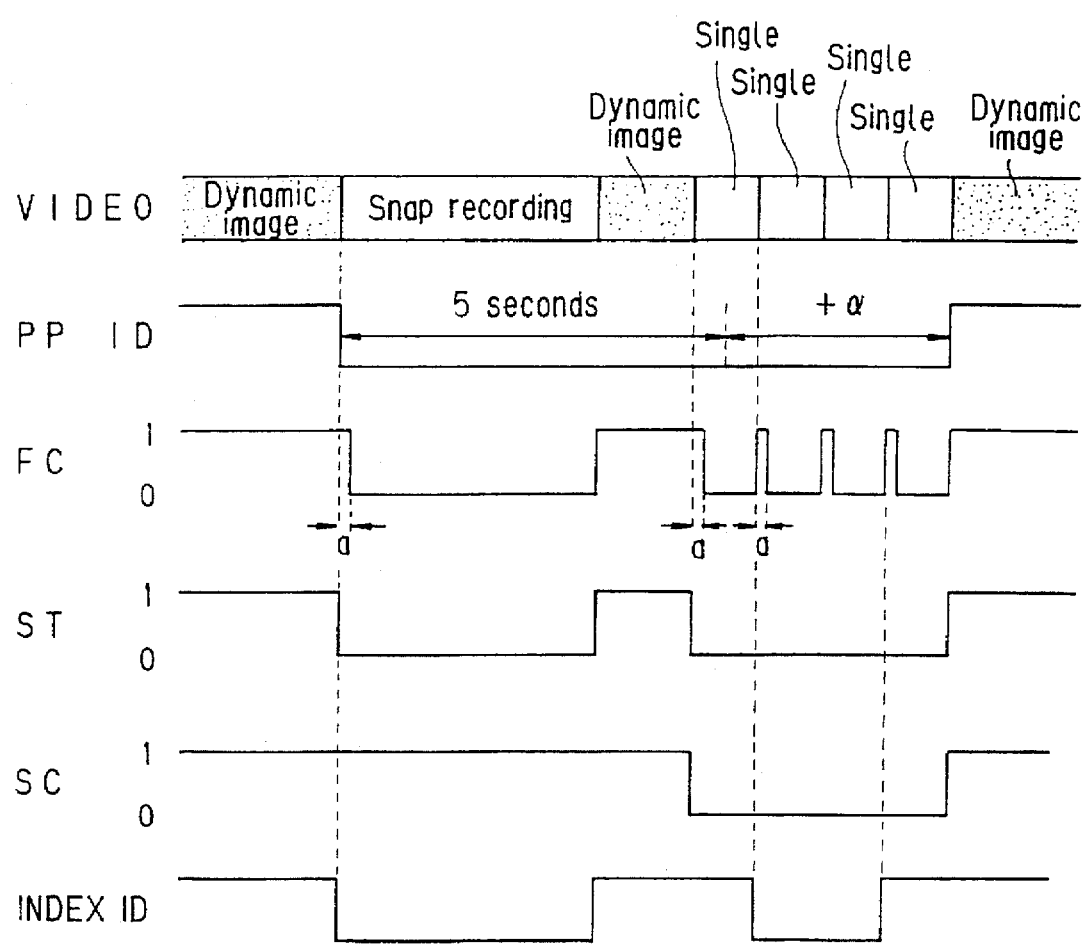
FIG. 1 is a timing chart illustrating a procedure for recording an ID signal for retrieving images according to one embodiment of the present invention.
Figure 2:
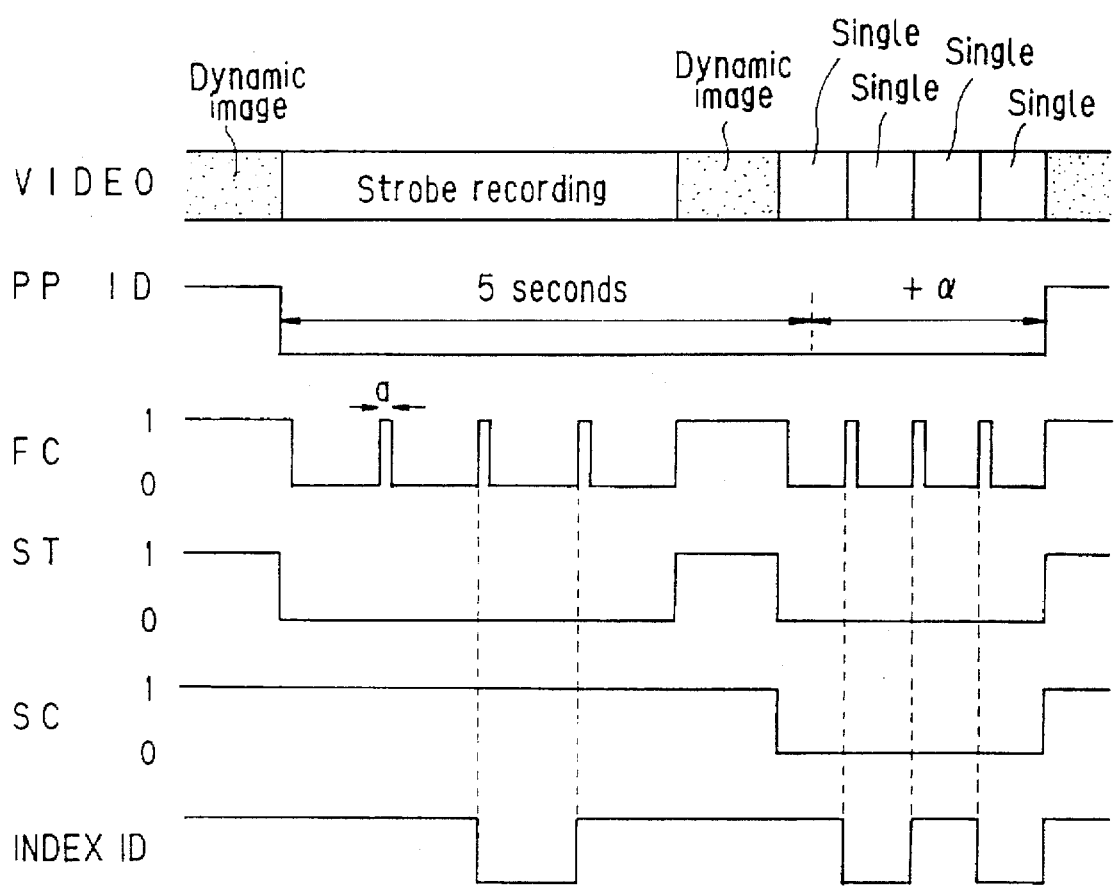
FIG. 2 is a timing chart illustrating a procedure for recording an ID signal for retrieving images according to another embodiment of the present invention.

The FC signal is recorded in the above-mentioned VAUX SOURCE CONTROL pack and indicative of whether there is a match or mismatch between current and previous frame images. The FC signal takes the values of '0' for a match and '1' for a mismatch. Consequently, it generally takes '0' for a static image recording portion and '1' for a dynamic image recording portion. Even for the static image recording portion, however, it is designed to take '1' only for the duration of the first one frame (The waveform of the FC signal is illustrated in FIGS. 1 and 2 wherein the duration 'a' is equivalent to the length of one frame). The FC signal generation circuit can be configured with a frame differential detection unit as shown in (2) of FIG. 44.

3. ST (STILL PICTURE) Signal

The ST signal is recorded in the same pack as the FC signal and indicative of whether recorded images are dynamic images or static images (snap recording images, strobe recording images, single-shot recording images, or single-shot successive recording images). The ST signal takes the values of '0' for a static image recording portion and '1' for a dynamic image recording portion. Incidentally, the ST signal is equivalent to a polarity reversal of the output of the AND circuit 22 in the PP ID signal generation circuit illustrated in (1) of FIG. 44.

4. SC (STILL CAMERA) Signal

The SC signal is also recorded on the abovementioned pack and takes the values of '0' for a static image recording portion on tape for reproduction with the reproduction unit in a paused state and '1' for a static image recording portion for reproduction in an ordinary manner. More specifically, the SC signal takes '0' only for single-shot recording and single-shot successive recording. The SC signal generation circuit can be configured as shown in (3) of FIG. 44. Like the PP ID signal, the FC, ST, and SC signals are automatically recorded on tape depending on the contents and recording modes of images recorded with the digital VTR.

5. INDEX ID Signal

The INDEX ID signal is recorded in the TAG subcode and subsequently implanted in locating the beginning of dynamic images or retrieving static images. The method of retrieving and searching static images using the above-mentioned ID signals will now be explained below.

3) Retrieval of Specific Static Images from Static Image Recording Portion

A method of retrieving specific static images from a static image recording portion will now be explained below with reference to FIGS. 1 and 2.

Referring to FIG. 1, there is shown an example in which the second and third snap recording and single-shot recording images are retrieved from a static image recording portion. These static images are retrieved by subsequently implanting the INDEX ID signal in that portion. According to one embodiment of the present invention, the INDEX ID signal is designed to have a variable implantation period so that it can be implanted only for a short period to allow retrieval of static images.

Since the INDEX ID signal is implanted for a shorter period in this application than in conventionally locating the beginning of dynamic images, it is usually not detected when searched to locate the beginning of dynamic images.

Referring to FIG. 2, there is shown another example in which the third one and the second and fourth ones are retrieved from four strobe recording images and four single-shot recording images, respectively, which are contained in a static image recording portion, in which the INDEX ID signal is subsequently implanted.

4) Retrieval of Specific Frame Images for the Duration of Dynamic Image Recording A method of retrieving specific frame images from a dynamic image recording portion will now be explained below with reference to FIG. 3.

Figure 3:
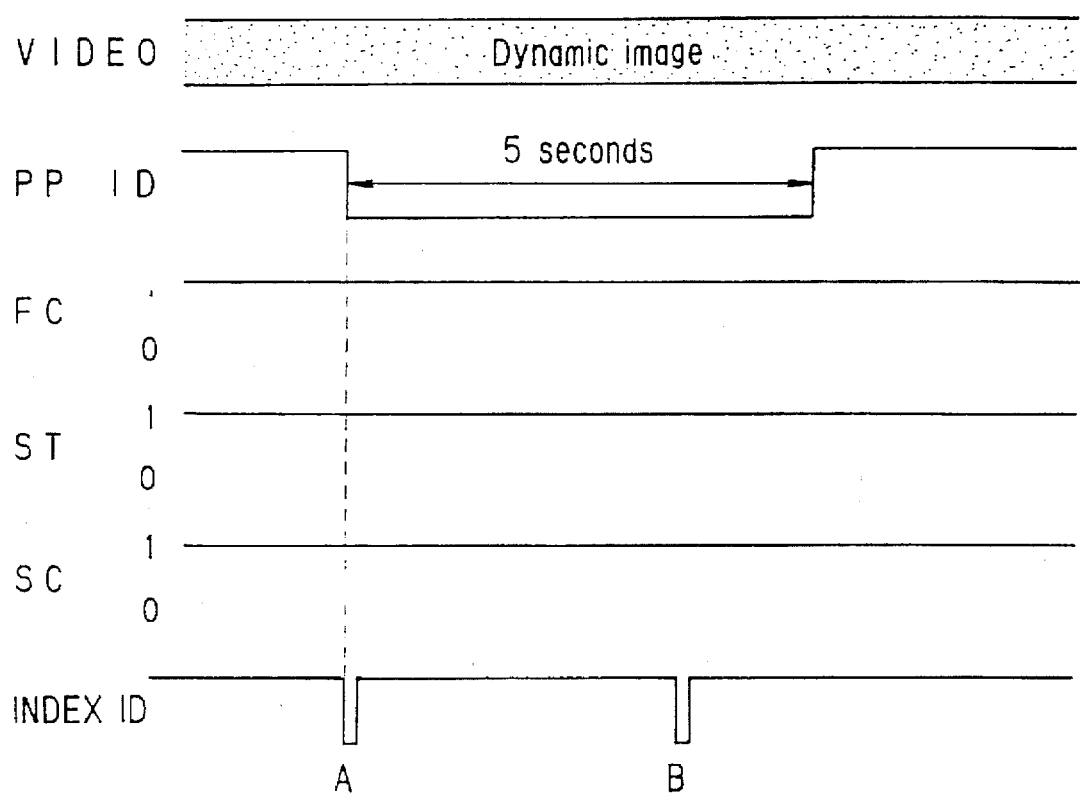
FIG. 3 is a timing chart illustrating a procedure for recording an ID signal for retrieving images on a dynamic image recording portion.

Referring to FIG. 3, since the PP ID signal is not originally contained in a dynamic image recording portion, desired frame images can be retrieved by subsequently implanting the PP ID signal in that recording portion for the duration of 5 seconds and subsequently implanting the INDEX ID signal only in the portion as shown in A.

Thus, when the recording portion of one frame image in which the PP ID signal is subsequently implanted contains another frame image, the latter frame image can be retrieved by subsequently implanting only the INDEX ID signal in that portion as shown in B.

In this connection, it is to be noted that the method of retrieving static images according to one embodiment of the present invention is, in principle, inapplicable to the cases where the INDEX ID signal for dynamic image search has already been recorded for the duration of 5 seconds in frame images to be retrieved from a dynamic image recording portion. In such cases, if the INDEX ID signal for dynamic image search may be deleted, the desired frame images can be retrieved by deleting the INDEX ID signal and then newly recording the PP ID signal and the INDEX ID signal in their recording portion as shown in FIG. 3.

Figure 4:
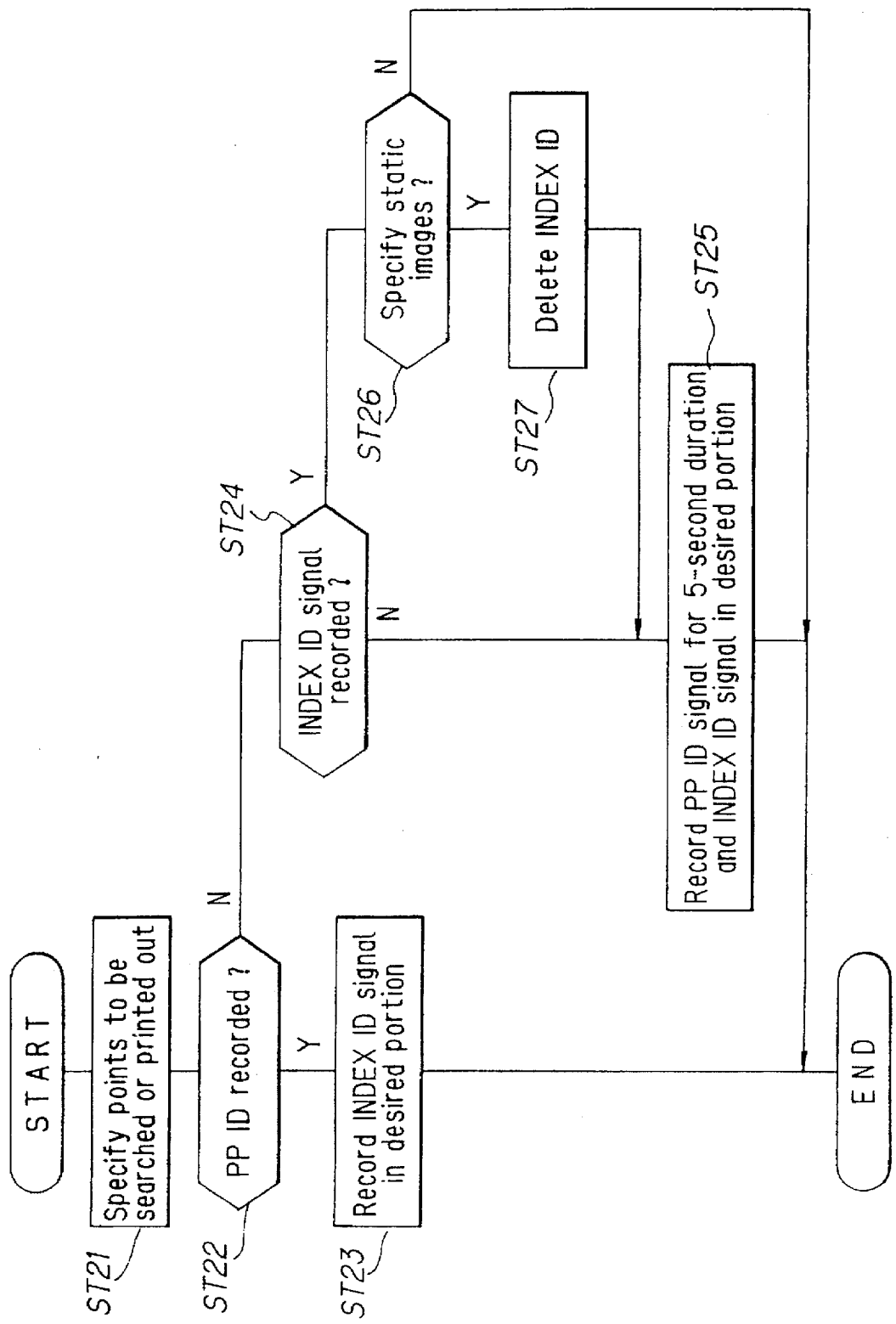
FIG. 4 is a flow chart illustrating a procedure for recording an ID signal for retrieving images on a user-specified portion.

Referring to FIG. 4, there is shown a flow chart illustrating the above-mentioned procedure for retrieving static images. First, the user specifies on the screen a recording portion from which to search or print out a desired static image and makes a static image search request to the microcomputer (in the step ST21). In response to this request, the microcomputer then examines whether the specified recording portion contains the PP ID signal (in the step ST22). If so, the specified recording portion is subsequently implanted with the PP ID signal (in the step ST23). If not (namely, if the specified recording portion is a dynamic image recording portion), the microcomputer examines whether the specified recording portion contains the INDEX ID signal (in the step ST24). If not, the specified recording portion is subsequently implanted with the PP ID signal and the INDEX ID signal to enable retrieval of the desired static image (in the step ST25).

If the specified recording portion contains the INDEX ID signal in the step ST24, this means that it contains the INDEX ID signal for dynamic image search. In this case, the microcomputer asks the user whether to delete the INDEX ID signal for dynamic image search and subsequently implant alternative signals for static image search (in the step ST26). If the user answers 'yes', the INDEX ID signal is deleted and then the PP ID signal and the INDEX ID signal are subsequently implanted to enable search of the desired static image (in the steps ST27 and ST25). If the user answers no, this procedure ends.

5) Method of Subsequently Implanting INDEX ID Signal

Figure 5:
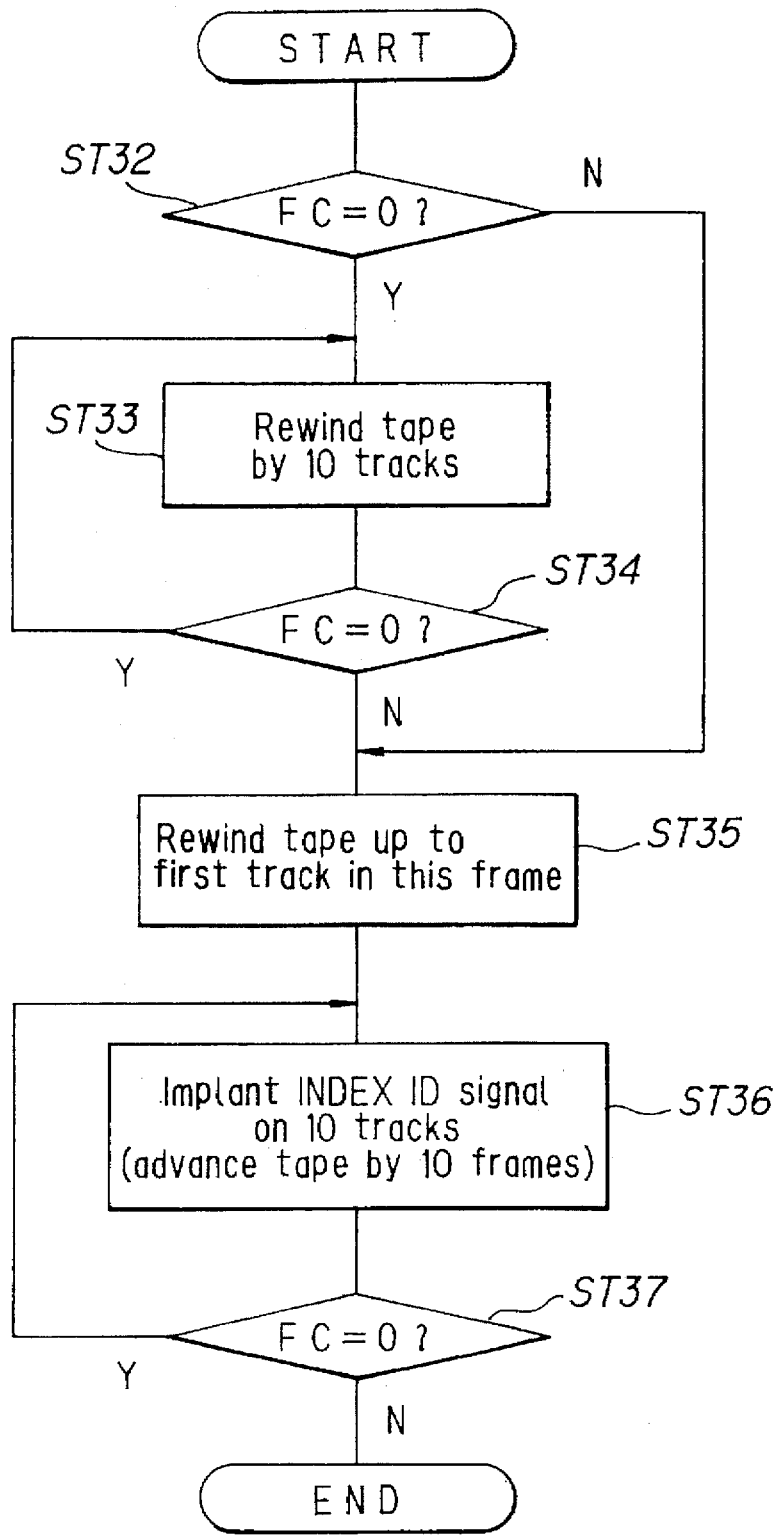
FIG. 5 is a flow chart illustrating one example of a procedure for recording the INDEX ID signal only for the duration of a specified image.

In the above-mentioned static image search procedure illustrated in FIG. 4, the specified recording portion is subsequently implanted with the INDEX ID signal accurately as shown in FIGS. 1 to 3. Such accurate subsequent implantation can be made by following a procedure illustrated in FIG. 5. This procedure will now be explained below with reference to FIG. 5.

First, the microcomputer judges whether the FC signal takes the value of '0' in the specified recording portion (in the step ST32). If 'yes' is assumed, this means that the specified recording portion is a static image recording portion. On the other hand, as is seen from the FC signal for the duration of the first one frame in snap recording, single-shot recording, and strobe recording portions in FIGS. 1 and 2, the FC signal always takes the value of '1' only for the duration of the first one frame in these individual recording portions. Consequently, the succeeding the steps ST33 and ST34 are repeated to rewind the tape to the first frame in which the FC signal takes the value of '1', namely the first frame in the specified static image recording portion.

Then, the tape is further rewound to the first track in the first frame (in the step ST35) to subsequently implant the INDEX ID signal for every 10 tracks until the frame immediately preceding the one in which the FC signal takes the value of '1' (in the steps ST36 and ST37). This ends the procedure for subsequently implanting the desired static image with the INDEX ID signal.

Meanwhile, 'no' is assumed in the step ST32 either when the user specifies the desired static image as a specific frame image in a dynamic image recording portion or when the specified static image recording portion is the first one frame in snap recording, single-shot recording, or strobe recording portions. At this time, the microcomputer jumps to the step ST35 to rewind the tape to the first track in the first one frame and then subsequently implant the INDEX ID signal for the duration of one frame (in the step ST36). In the former case, the FC signal takes the value of '1' in the step ST37, thus ending the implanting procedure. In the latter case, 'yes' is initially assumed in the step ST37 and the INDEX ID signal is subsequently implanted repeatedly up to the last frame in the specified static image recording portion and then the procedure ends.

Further, it can be readily judged from the ST signal whether the specified recording portion is a dynamic image recording portion and from the SC signal whether it is a single-shot recording portion. Based on these judgments, therefore, the INDEX ID signal can be subsequently implanted by following a procedure illustrated in FIG. 6.

Figure 6:
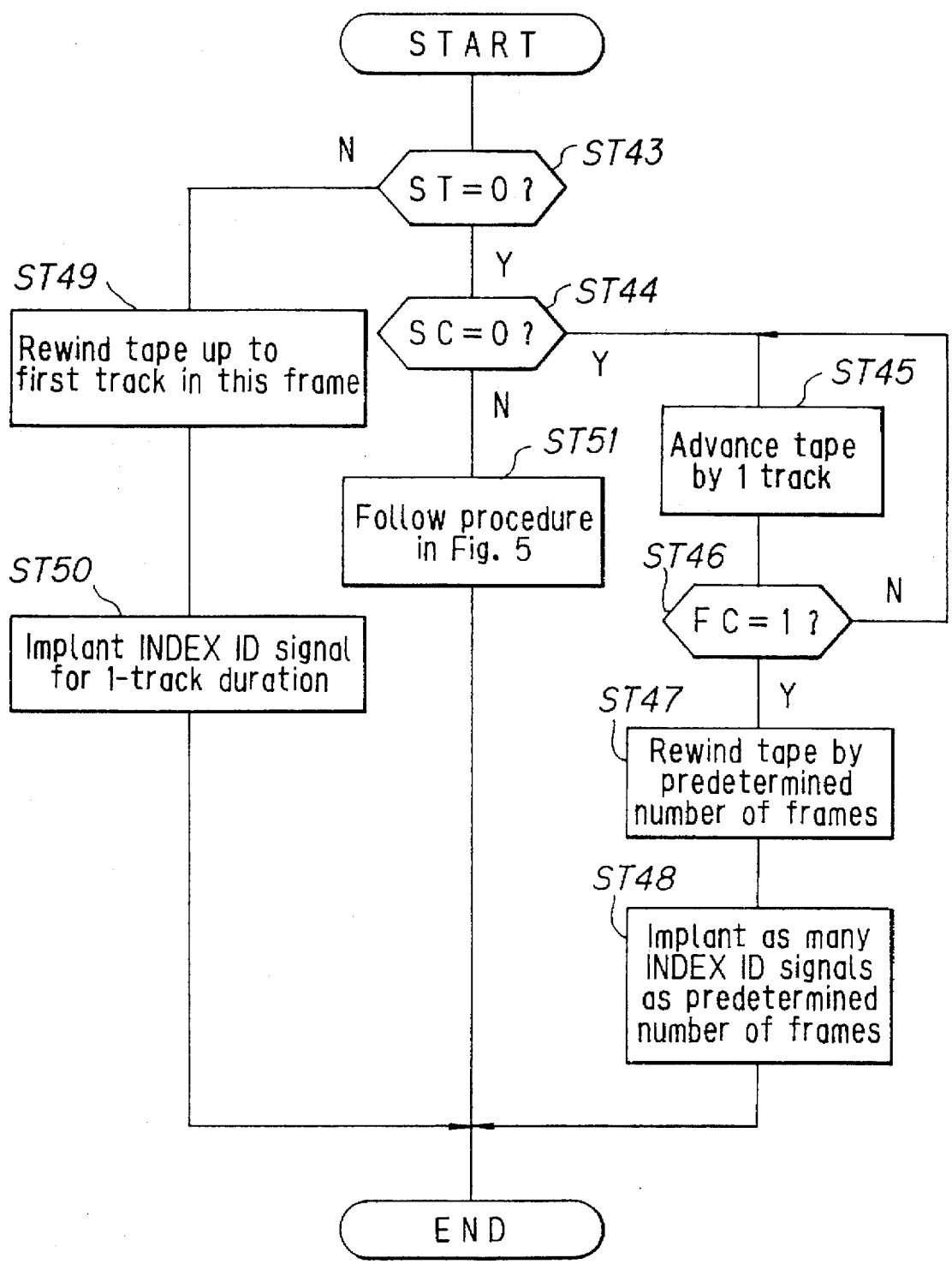
FIG. 6 is a flow chart illustrating another example of a procedure for recording the INDEX ID signal only for the duration of a specified image.

Referring to FIG. 6, there is shown a flow chart illustrating a procedure for subsequently implanting the INDEX ID signal. First, the microcomputer judges from the ST signal whether the specified recording portion is a dynamic image recording portion and, if so, the tape is rewound to the first track in the specified frame to subsequently implant the INDEX ID signal for the duration of one frame (in the steps ST49 and ST50). If the specified recording portion is judged to be a static image recording portion (namely, 'yes' is assumed in the step ST43), the microcomputer examines whether it is a single-shot recording portion (in the step ST44) and, if so, the tape is advanced to the end of the single-shot recording portion at which the FC signal changes its value from '0' to '1' (in the steps ST45 and ST46). Next, the tape is rewound by the number of frames equivalent to the duration of the single-shot recording portion to return to its beginning to subsequently implant as many INDEX ID signals as the number of frames in the single-shot recording portion (in the steps ST47 and ST48). If the specified recording portion is judged to be a snap recording portion or a strobe recording portion (namely, 'no' is assumed in the step ST44), the INDEX ID signal is subsequently implanted by following the procedure illustrated in FIG. 5 (in the step ST51).

6) Search of Static Images

The tape thus implanted with the PP ID signal and the INDEX ID signal can be loaded in a recorded image reproduction apparatus to search desired static images from these ID signals (referred to as PP MARK search according to one embodiment of the present invention). A procedure for PP MARK search will now be explained below with reference to FIG. 7.

Figure 7:
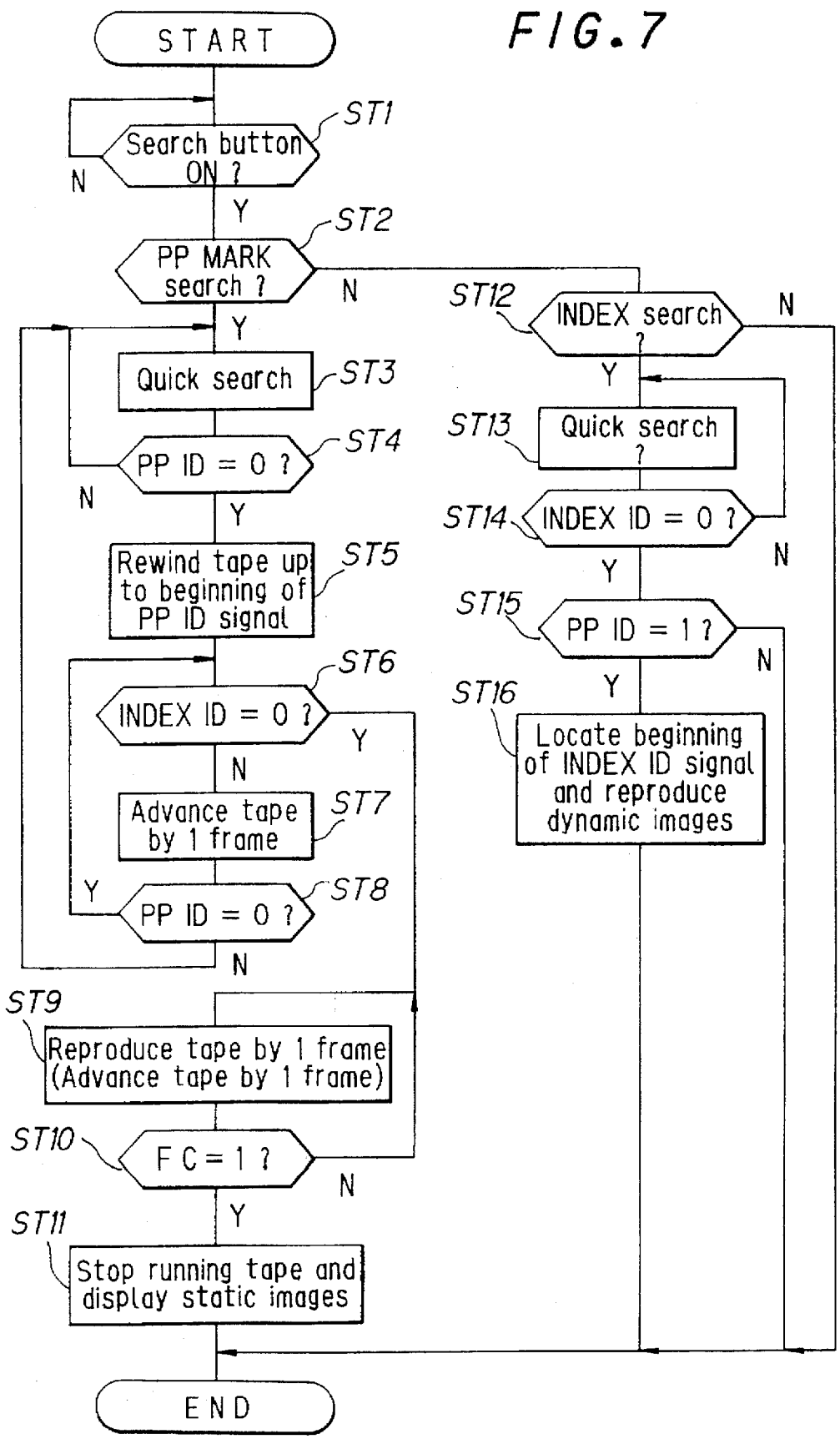
FIG. 7 is a flow chart illustrating a procedure for searching a specified image portion for reproduction and display.

Referring to FIG. 7, there is shown a flow chart illustrating a procedure for PP MARK search. First, the microcomputer examines whether any search request has been made by the user (in the step ST1) and, if so, examines whether it is a PPMARK search request. If so, the tape is run at high speeds to quickly search a static image recording portion whose subcode data contains the PP ID signal (in the steps ST3 and ST4). When the static image recording portion is located, the tape is slowed down and rewound to the beginning of the PP ID signal (in the step ST5). Then, the tape is advanced at low speeds until the INDEX ID signal is detected to locate the desired static image (by repeating the loop from the steps ST6 to ST8). When the desired static image is located, it is reproduced until the end of its recording portion at which the FC signal changes its value from '0' to '1' (in the steps ST9 and ST10).

When the end of the static image recording portion is reached, the tape is stopped from running while the static image data is read repeatedly from the image memory for reproduction on the display (in the step ST11). If the INDEX ID signal cannot be detected by repeating the loop from the steps ST6 to ST8, the microcomputer returns to the step ST3 to make another attempt at quick search of the next static image recording portion.

If 'no' is assumed in the step ST2, the microcomputer examines whether the user request is a dynamic image search request (in the step ST12) and, if so, quickly searches the subcode data which is subsequently implanted with the INDEX ID signal (in the steps ST13 and ST14). When this subcode data is located, the microcomputer examines whether it is further subsequently implanted with the PP ID signal (in the step ST15) and, if not, assumes it to be the specified dynamic image recording portion to rewind the tape to the beginning of the INDEX ID signal and start reproducing the desired dynamic image (in the step ST16).

If the subcode data has been implanted with the PP ID signal in the step ST15, this means that this data is specified for static image search and not dynamic image search, so that no image reproduction takes place. If 'no' is assumed in the step ST12, the microcomputer shifts to any other type of search than specified by the user (e.g. search from recording dates, months, years, etc.).

Thus, it is possible to retrieve a static image subsequently implanted with the INDEX ID signal by following the above-mentioned PP MARK search procedure. Should the static image thus retrieved for display fail to match the desired one, however, it is necessary to ensure that another attempt can be made at next search (referred to as NEXT search according to one embodiment of the present invention). A procedure for NEXT search will now be explained below with reference to FIG. 8.

Figure 8:
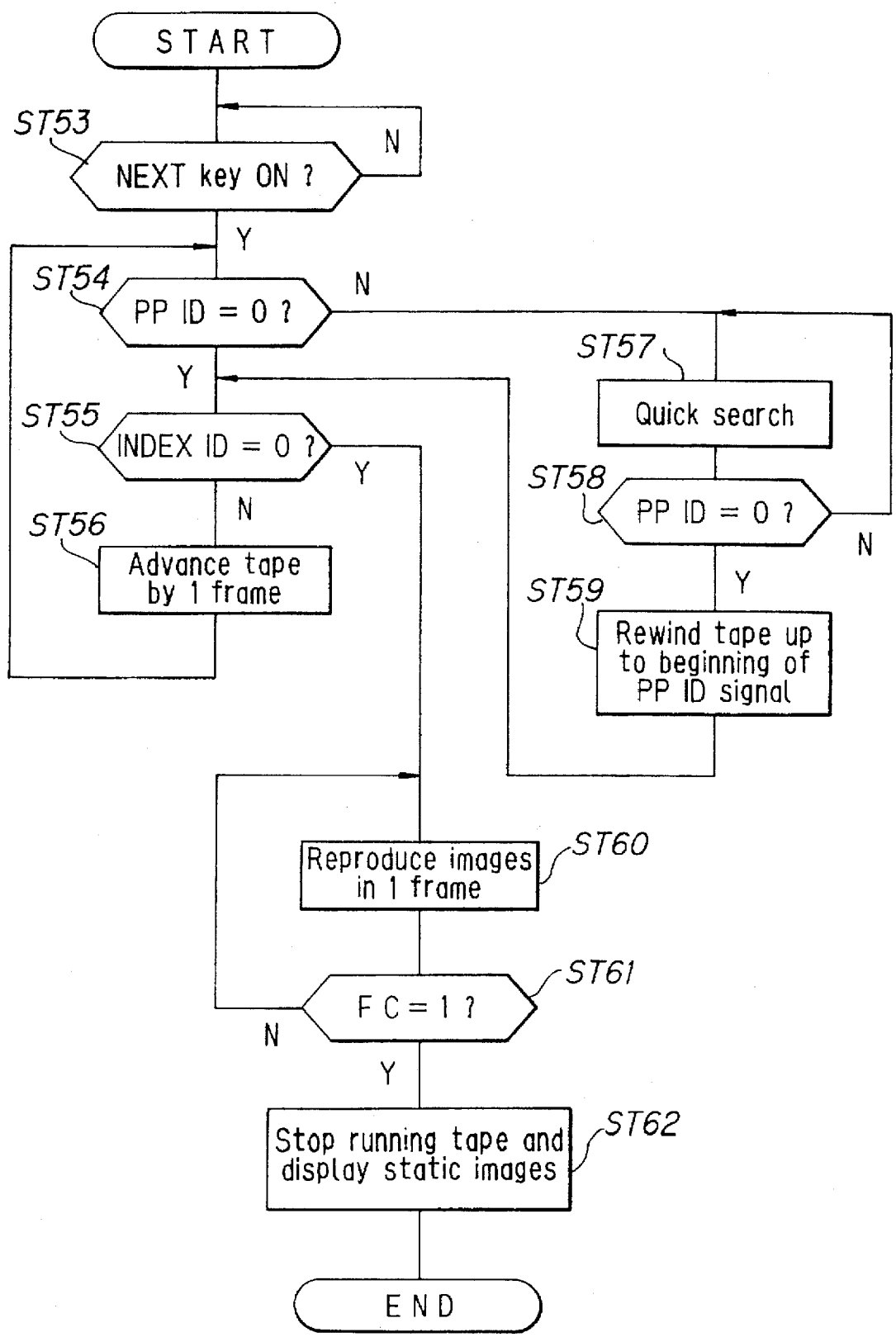
FIG. 8 is a flow chart illustrating a procedure for retrieving a next static image in NEXT search.

Referring to FIG. 8, there is shown a flow chart illustrating a procedure for NEXT search. First, when the user presses the NEXT key to make a NEXT search request, the microcomputer examines the value of the PP ID signal at the current tape position (in the step ST54). If the PP ID signal is indicative of a static image recording portion, the tape is advanced at low speeds to search the portion for the INDEX ID signal (by repeating the loop from the steps ST54 to ST56). When the INDEX ID signal is detected to locate the next static image, it is reproduced until the end of its recording portion at which the FC signal changes its value from '0' to '1' (in the steps ST60 and ST61). When the end of the static image recording portion is reached, the tape is stopped from running to display the next static image thus retrieved (in the step ST62).

If the next INDEX ID signal cannot be detected by repeating the loop from the steps ST54 to ST56, the microcomputer proceeds to the steps ST57 and ST58 to make another attempt at quick search of the next static image recording portion. When the next static image recording portion is located, the tape is rewound to its beginning (in the step ST59) to repeat the loop from the steps ST54 to ST56 for retrieving the desired static image. The above-explained procedure applies when static images are searched with tape running at high speeds in the forward direction. Static images can also be searched with tape running at high speeds in the backward direction by following, for example, a procedure illustrated in FIG. 9.

Figure 9:
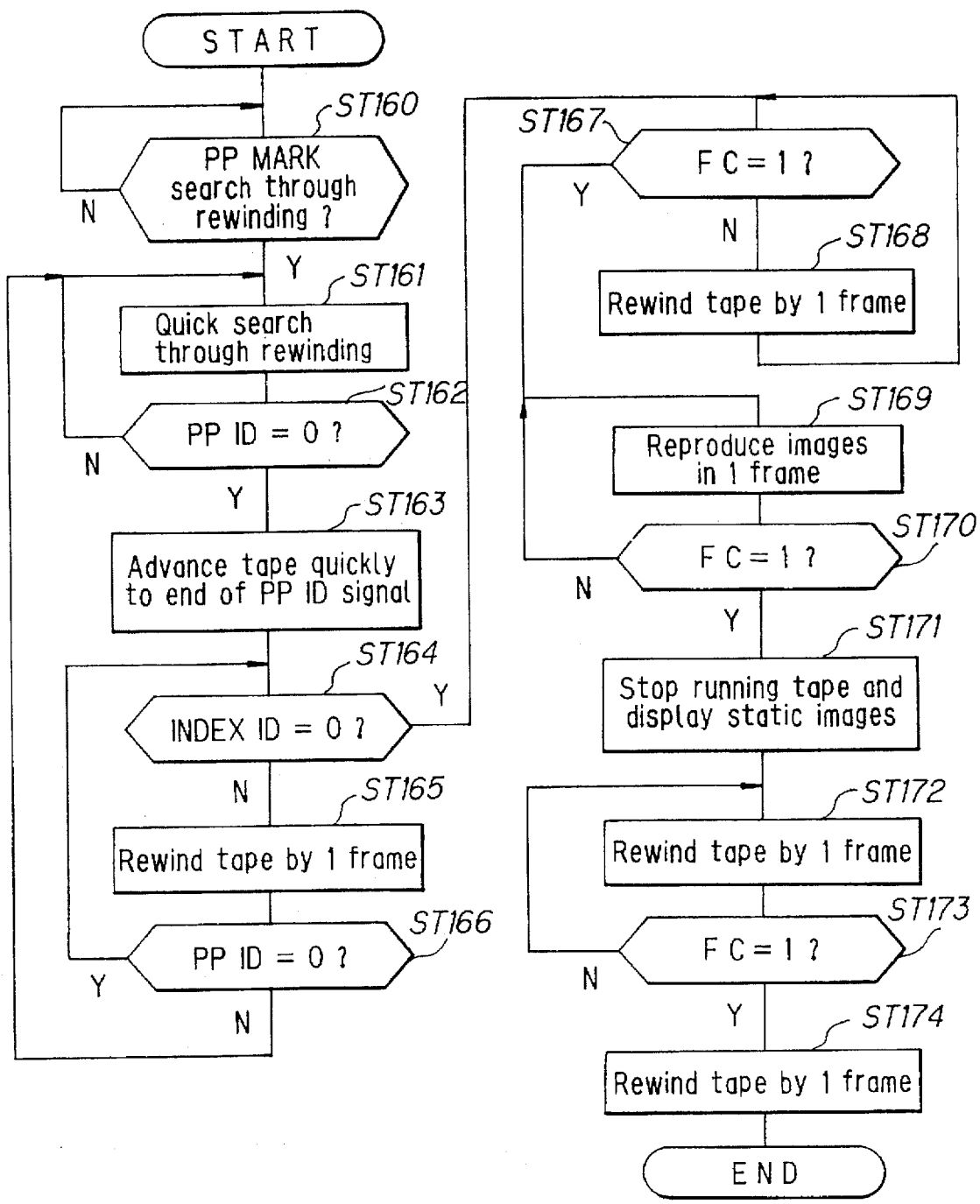
FIG. 9 is a flow chart illustrating a procedure for retrieving static images in search through rewinding.

Referring to FIG. 9, there is shown a flow chart illustrating a procedure for backward search. First, when the user makes a backward search request, the microcomputer rewinds the tape at high speeds to search a static image recording portion (in the steps AT160 to ST162). When a static image recording portion is located, the tape is advanced quickly to its end (in the step ST163) and then rewound at low speeds in units of one frame to search the specified static image recording portion at which the INDEX ID signal takes the value of '0' (by repeating the loop from the steps ST164 to ST166). When the specified static image recording portion is located, the tape is further rewound in units of one frame to return to its beginning at which the FC signal takes the value of '1' (in the steps ST167 and ST170) and reproduce it up to its end (in the steps ST169 and ST170). Then, the tape is stopped from running to display the desired static image (in the step ST171).

When the desired static image is displayed for its entire duration, the tape is rewound again to the beginning of the static image recording portion (in the steps ST172 and ST173) and then rewound by one frame to stop at the immediately preceding recording portion (in the step ST174). The purpose of rewinding the tape up to the recording portion immediately preceding the located static image recording portion is to enable NEXT search through rewinding. A procedure for NEXT search through rewinding will now be explained below with reference to FIG. 10.

Figure 10:
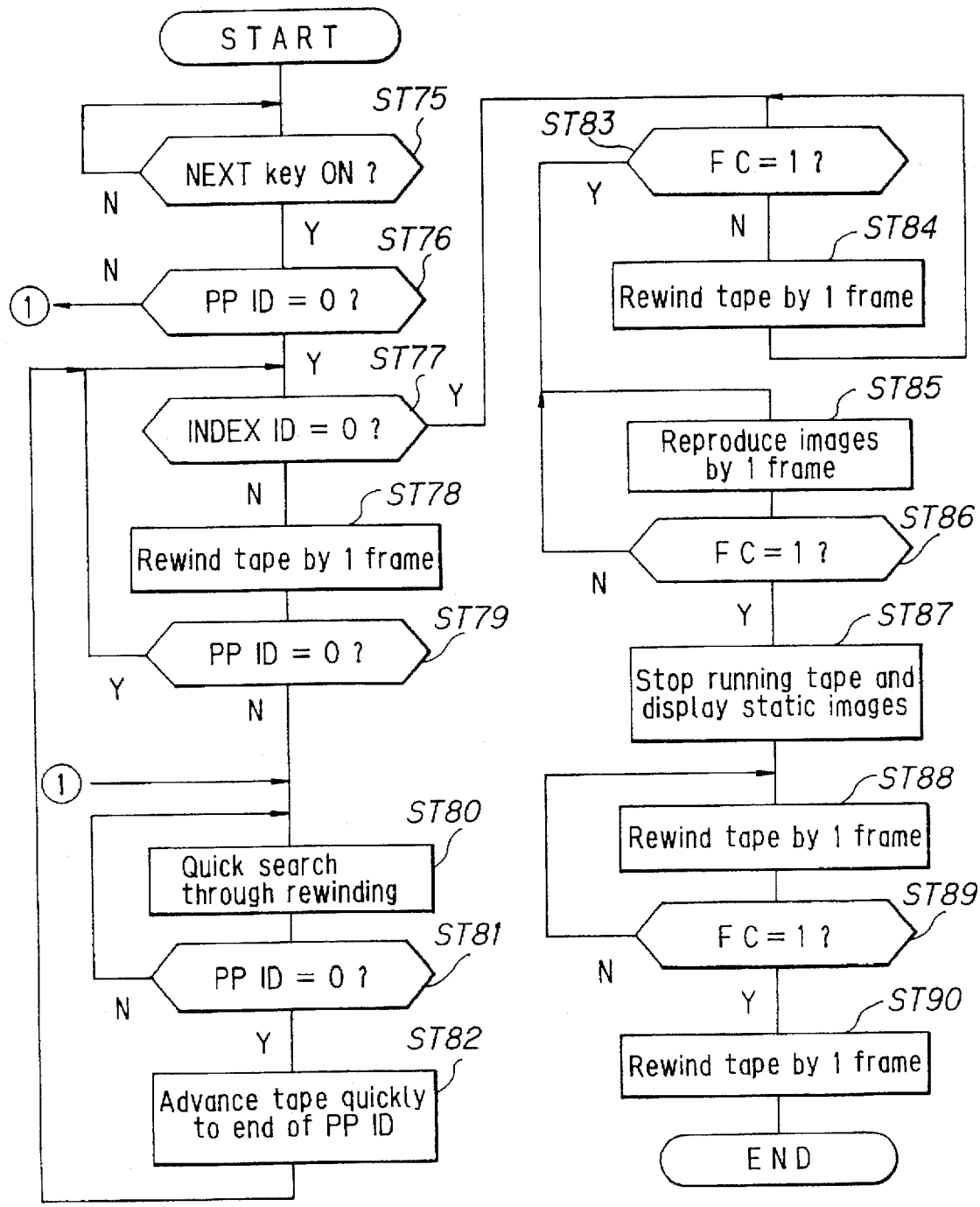
FIG. 10 is a flow chart illustrating a procedure for retrieving the next static image in NEXT search through rewinding.

Referring to FIG. 10, there is shown a flow chart illustrating a procedure for NEXT search through rewinding. First, when the user pressed the NEXT key to make a NEXT search request, the microcomputer examines whether the current tape position is a static image recording portion (in the step ST76) and, if so, rewinds the tape until locating a static image subsequently implanted with the INDEX ID signal (by repeating the loop from the steps ST77 to ST79). If the INDEX ID signal cannot be detected in the static image recording portion, 'no' is assumed in the step ST79 to proceed to the steps ST80 and ST81 to quickly search the next static image recording portion through rewinding (this quick search through rewinding is made immediately when 'no' is assumed in the step ST76). When the next static image recording portion is located, the tape is advanced at high speeds to its end to restart the loop from the steps ST77 to ST79 for detecting the INDEX ID signal. The operations in the steps ST83 to ST90 following detection of the INDEX ID signal in the step ST77 are equivalent to those in the steps ST167 to ST174 in FIG. 9 and display the desired static image located by NEXT search.

7. Circuit for Automatically Switching Reproduction Mode of Digital VTR

According to one embodiment of the present invention, the digital VTR is capable of recording not only ordinary dynamic images but also various static images as explained above. When playing tape carrying a mixture of ordinary dynamic images and various static images, in particular, when reproducing image signals in the single-shot recording portion on the head, it is necessary to stop the tape from running instantly as well as switch the operation mode of the reproduction apparatus in such a manner as to once store the reproduced signals in the image memory and then read them repeatedly from the image memory in order to display static images.

Figure 11:
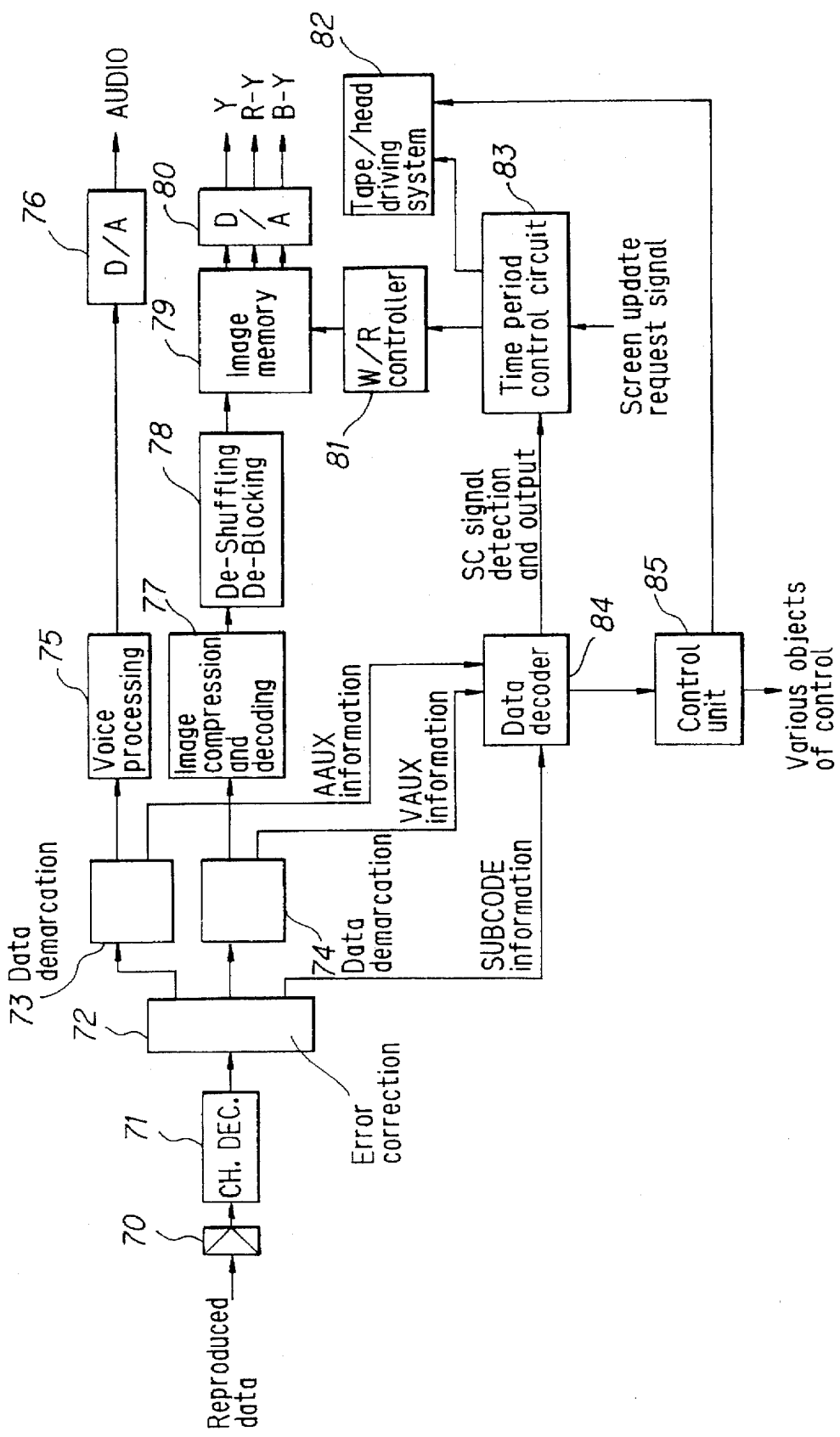
FIG. 11 is a circuit diagram illustrating a circuit for automatically switching a reproduction mode in a digital VTR reproduction system.

A recorded image reproduction apparatus arranged to automatically switch its reproduction mode according to one embodiment of the present invention will now be explained below with reference to FIG. 11 wherein reproduced image data from the reproduction head is fed via the reproduction amplifier 70 and the channel decoder 71 to the error correction circuit 72, where the data is corrected to remove any error and then divided into three types of data in the AUDIO area, VIDEO area, and SUBCODE area. The AUDIO area data thus separated is fed to the data demarcation circuit 73, where it is further divided into audio data and AAUX information with the former output as an audio signal via the voice processing circuit 75 and the D/A conversion circuit 76.

On the other hand, the VIDEO area data is fed to the data demarcation circuit 74, where it is further divided into video data and VAUX information with the former stored in the image memory 79 via the image compression and decoding circuit 77 and the de-shuffling and de-blocking circuit 78. A video signal read from the image memory 79 is converted by the D/A conversion circuit 80 into original Y, R-Y, and B-Y signals, which are fed to the display to reproduce images.

Further, subcode information from the error correction circuit 72 is fed to the data decoder 84 together with the AAUX information and the VAUX information from the data demarcation circuits 73 and 74, respectively. These types of information are decoded to produce various types of data, which are fed to the control unit 85, which, in turn, provides various types of control such as search based on TAG data contained in the subcode information and display of character information contained in the AAUX information and the VAUX information. Also provided is the time period control circuit 83 for automatically switching the reproduction mode between reproduction of the single-shot recording portion and reproduction of any other recording portion. The specific operation of the time period control circuit 83 will now be explained below with reference to FIG. 12.

Figure 12:
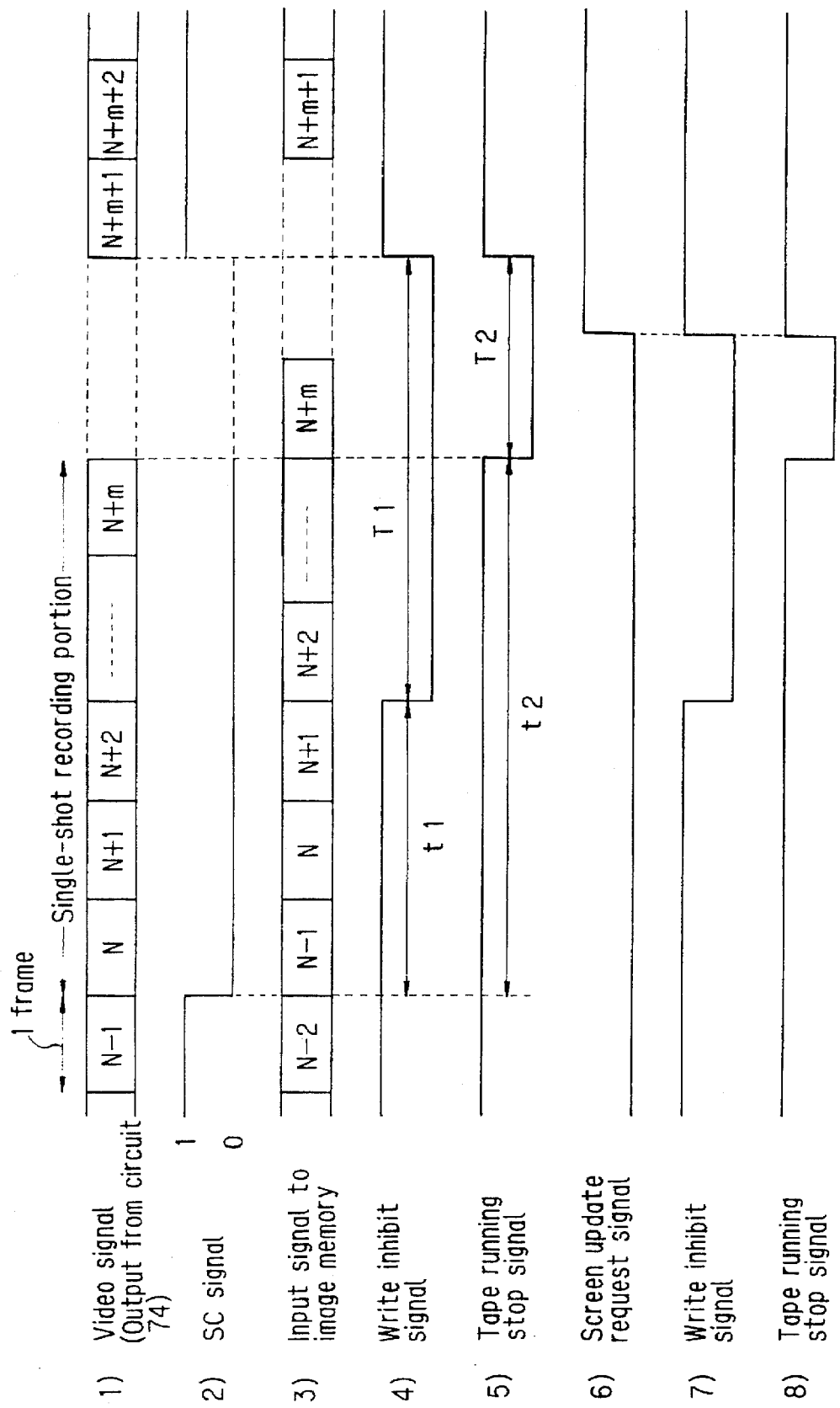
FIG. 12 is a timing chart illustrating a procedure for automatically switching a reproduction mode.

Referring to FIG. 12, the video signal 1) represents video data input from the data demarcation circuit 74 to the image compression and decoding circuit 77 and its duration from Frame N to Frame N+m constitutes one single-shot recording portion. Only for this duration, the corresponding SC signal 2) in the VAUX SOURCE CONTROL pack in the VAUX information takes the value of '0'. Assuming that one frame is equivalent to a time lag accompanied by -shuffling by the de-shuffling and de-blocking circuit 78 in FIG. 11, the video signal input to the image memory 3) lags behind the video signal 1) by one frame.

Meanwhile, the SC signal 2) in the VAUX SOURCE CONTROL pack, after decoded in the data decoder 84, in input to the time period control circuit 83, which outputs the write inhibit signal 4) to the write and read controller 81 in response to the SC signal 2) as well as outputs the tape running stop signal 5) to the tape and head driving system 82. At this time, the write and read controller 81 stops writing the image signal to the image memory in response to the write inhibit signal 4 during the time T1 from Frame N+2 in 3). Accordingly, the image signal only in Frame N+1 is read repeatedly from the image memory for the time T1, thus reproducing static images on the display.

Further, the tape and head driving system 82 stops the tape from running in response to the tape running stop signal 5) for the duration from the reproduction of the image signal in Frame N+m at the end of the single-shot recording portion in 1) to the completion of the static image display time T1 for display of static images. After a lapse of the static image display time T1, the tape and head driving system 82 restarts ordinary write and read operations and running the tape, reproducing dynamic images from Frame N+m+1 Frame on the display. It is to be noted here that the static image display time T1 is preset to about a few dozen seconds or any value adjustable by the user. Further, although the time t1 up to the start of write inhibition is set to 3 frames in this embodiment, it is not necessary to limit it to this value but recommendable to set it in such a manner that one frame in the vicinity of the middle of the single-shot recording portion is read repeatedly from the image memory. The value of the time t2 is determined from the number of frames (a predetermined value) in the single-shot recording portion.

With the above-mentioned circuit configuration, the tape is automatically stopped from running to display static images in the single-shot recording portion during a predetermined period and then restart reproduction of dynamic images. While static images are displayed, next dynamic images can be displayed immediately by operating the screen update key on the recorded image reproduction apparatus to input the screen update request signal 6) to the time period control circuit 83 and thereby forcefully resetting the write inhibit signal 7) and the tape running stop signal 8).

Although a time lag accompanied by de-shuffling is equivalent to one frame according to the above-mentioned embodiment of the present invention, it is to be understood that the time lag varies depending on the type of de-shuffling and may therefore take other values such as two frames, for example, without affecting automatic switching of the reproduction mode. Lastly, a procedure for such automatic switching will now be explained below with reference to FIG. 13.

Figure 13:
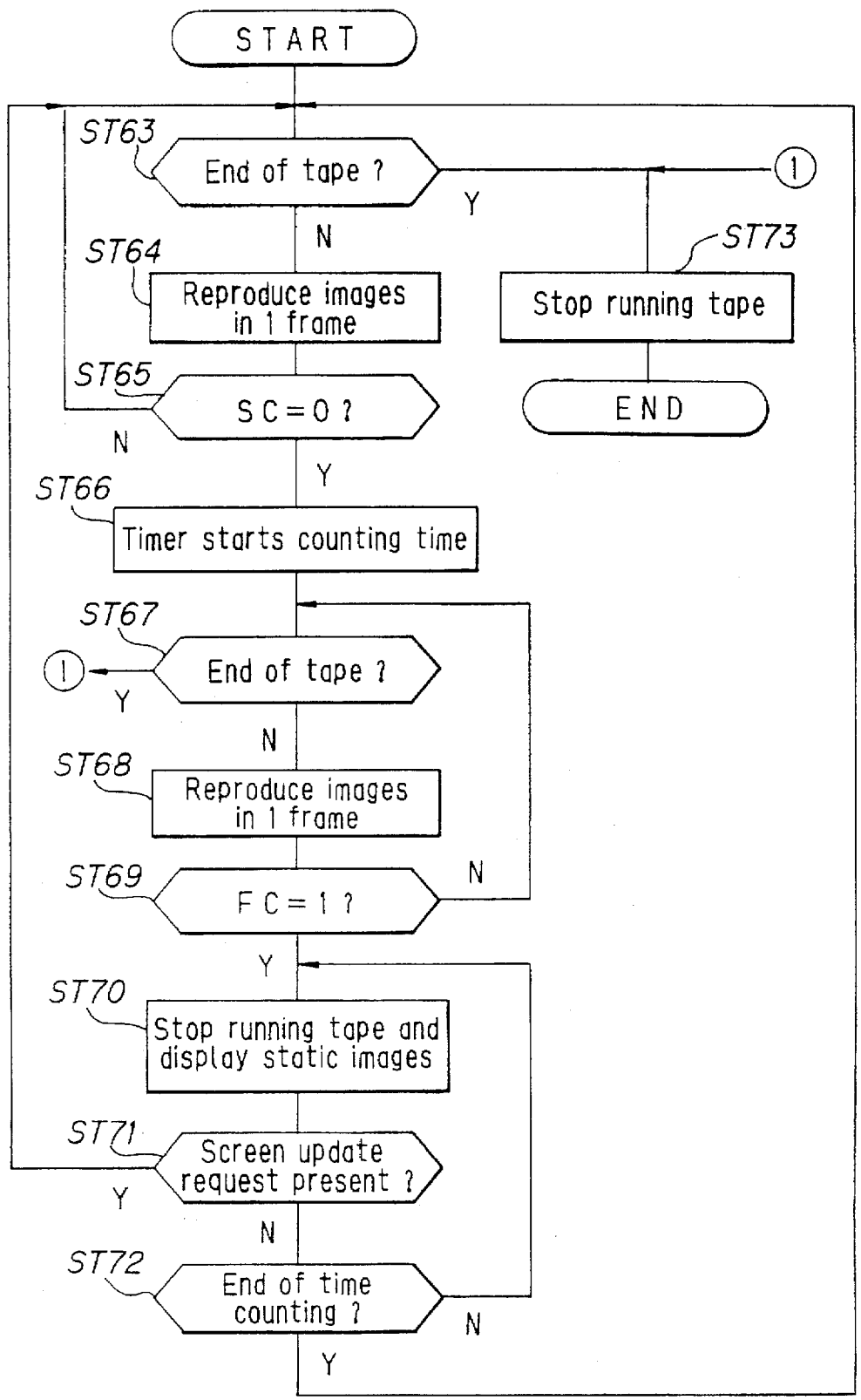
FIG. 13 is a flow chart illustrating a procedure for automatically switching a reproduction mode under the control of a microcomputer.

Referring to FIG. 13, there is shown a flow chart illustrating a procedure for automatically switching the reproduction mode of single-shot recording images under the control of the microcomputer. For the duration of the ordinary dynamic image recording portion, the microcomputer repeats the loop from the steps ST63 to ST65 to reproduce dynamic images. When the single-shot recording portion is reached, 'yes' is assumed in the step ST65 and the timer starts counting static image display time to be set (in ST66). For the duration of the single-shot recording portion, the tape is run to reproduce static images until the end of the portion at which the FC flag changes its value from '0' to '1' (by repeating the loop from the steps ST67 to ST69). When the end of the single-shot recording portion is reached, the tape is stopped from running until the end of static image display time set by the timer while static images are read repeatedly from the image memory for reproduction on the display (by repeating the loop from the steps ST70 to ST72).

If the user makes any screen update request during display of static images, the microcomputer returns to the loop from the steps ST63 to ST65 to restart reproduction of dynamic images (in the step ST71). Similarly, reproduction of dynamic images is also restarted if the end of static image display time is confirmed in the step ST72. If the end of the tape is detected during its running, it is stopped from running to complete reproduction of any images (in the steps ST63, 67, and 73).

Although a method of recording ID signals for retrieving images, a method of retrieving images, and a recorded image reproduction apparatus according to the present invention have been fully described in terms of its one preferred embodiment in which they are applied to a digital VTR, it is to be understood that the present invention is not limited to such a particular embodiment and may be applied to other types of recorded image reproduction apparatus, such as an analog VTR, which are capable of recording multiple ID signals with functions equivalent to those of the above-mentioned PP ID, INDEX ID, FC, SC, and ST signals. It will therefore be obvious to those skilled in the art that various structural changes and modifications may be made within the meets and bounds of the present invention and without departing from its spirit and scope.

What is claimed is:

1. A method of recording identification signals on a recording medium for retrieving static video frames during a quick search operation from among static and dynamic video frames stored in recording portions on said recording medium, said quick search operation being conducted more quickly than a normal mode search, comprising the steps of:

recording for a first predetermined time a first identification signal identifying a plurality of said static and dynamic video frames in said recording portions which include a static video frame, wherein said first predetermined time is sufficient to allow detection of said first identification signal during said quick search operation;

selecting a desired static video frame from among said static and dynamic video frames recorded in a respective recording portion of said recording portions;

implanting, for a second predetermined time shorter than a sufficient time to allow detection during said quick search operation, into said respective recording portion subsequent to the recording of said recording portions, a second identification signal identifying said desired static video frame; and retrieving said desired static video frame by detecting said first identification signal corresponding to said respective recording portion during said quick search operation, detecting thereafter said second identification signal corresponding to said desired static video frame, and reproducing said desired static video frame identified by said second identification signal.

2. The method according to claim 1, wherein said step of recording said first identification signal digitally records on said recording medium a photo/picture identification impulse for the duration of each recording portion which includes a static video frame.

3. The method according to claim 2, wherein said photo/picture identification impulse is recorded for said first predetermined time of at least five seconds.

4. The method according to claim 3, wherein said step of implanting said second identification signal digitally records on said recording medium an index identification impulse for the duration of said desired static video frame.

5. The method according to claim 4, further comprising the step of digitally recording a frame change impulse identifying where said recording medium changes between static and dynamic video frames.

6. The method according to claim 5, further comprising the step of digitally recording a still picture impulse identifying said static video frame including a snap video frame which is a static video frame recorded for more than one frame, strobe video frames which are a series of correlated static video frames, and a single shot video frame which is an uncorrelated static video frame.

7. The method according to claim 6, further comprising the step of digitally recording a still camera impulse identifying said single shot video frame.

8. The method according to claim 7, wherein said recording medium is a tape medium with tracks of digital information recorded thereon, further comprising the steps of:

determining whether said still picture impulse indicates a respective static video frame;

rewinding said tape medium to a first track in said respective static video frame; and implanting said index identification impulse into said respective recording portion for one track of said respective static video frame.

9. The method according to claim 8, further comprising the steps of:

determining whether said still camera impulse indicates a respective single shot video frame;

advancing said tape medium by one track when said respective single shot video frame is determined and while said frame change impulse indicates that said single shot video frame does not change to a dynamic video frame;

rewinding said tape medium by a predetermined number of frames to a beginning of said single shot video frame; and implanting a number of index identification impulses equal to said predetermined number of frames.

10. The method according to claim 7, further comprising the steps of:

executing a photo/picture mark search operation which performs said quick search operation for each photo/picture identification impulse;

detecting a photo/picture identification impulse;

advancing, in response to the detection of a photo/picture identification impulse, said recording medium at a sufficiently lower speed than said quick search operation to detect said index identification impulse; and retrieving said static video frame corresponding to each index identification signal in each recording portion identified by said photo/picture identification impulse.

11. The method according to claim 10, further comprising the steps of:

determining whether a current recording portion includes additional index identification impulses;

advancing, in response to the determination that said current recording portion includes an additional index identification impulse, said recording medium at said sufficiently lower speed to detect said additional index identification impulses;

retrieving additional static video frames corresponding to said additional index identification impulses; and executing another said photo/picture mark search operation to detect a next photo/picture identification impulse corresponding to a subsequent recording portion.

12. The method according to claim 11, wherein said recording medium is a tape medium with tracks of digital information recorded thereon, further comprising the steps of:

executing a backward search operation by rewinding said tape medium until said static identification impulse is detected;

further rewinding said tape medium in units of one frame to return to a point where said frame change impulse indicates a change from said dynamic video frame to said static video frame; and retrieving said static video frame corresponding to said frame change impulse.

13. The method according to claim 12, further comprising the steps of:
   pausing the rewinding of said tape medium and the retrieval of said desired static video frame corresponding to said frame change impulse; and
   executing a next backward search operation for a next desired static video frame.

14. The method according to claim 13, further comprising the step of automatically switching between single shot video frame reproduction mode and dynamic video frame reproduction mode, wherein said single shot video frame reproduction mode pauses said reproduction after each static video frame is reproduced and said dynamic video frame reproduction mode continuously reproduces said dynamic video frames.

15. The method according to claim 5, wherein said recording medium is a tape medium with tracks of digital information recorded thereon, further comprising the steps of:
   determining whether said frame change impulse in said respective recording portion indicates a frame change from said dynamic video frame to said static video frame; and
   rewinding, in response to a frame change determination from said dynamic video frame to said static video frame, said tape medium to a first track of a frame where said frame change occurs.

16. The method according to claim 15, further comprising the steps of:
   rewinding, in response to no frame change, said tape medium by ten tracks; and
   determining again whether said frame change impulse in said respective recording portion indicates a frame change from said dynamic video frame to said static video frame.

17. The method according to claim 16, wherein said step of implanting said second identification signal implants said index identification signal for ten tracks beginning with said first track in said frame where said frame change occurs; and
   implanting said index identification signal for every ten tracks thereafter until said frame change signal indicates a change from said static video frame back to said dynamic video frame.

18. The method according to claim 4, further comprising, in response to the selection of said desired static video frame, the steps of:
   determining that said respective recording portion contains said photo/picture identification impulse indicating that the respective recording portion includes said static video frames; and
   implanting, in response to determining said photo/picture identification impulse, said index identification impulse into said respective recording.

19. The method according to claim 18, further comprising the steps of:
   determining that said respective recording portion does not contain said photo/picture identification impulse indicating that the respective recording portion is a dynamic image recording portion containing only dynamic video frames;
   determining that said respective recording portion does not contain said index identification impulse; and
   implanting, in response to determining that said respective recording portion does not contain photo/picture and index identification impulses, said photo/picture identification impulse and said index identification impulse into said respective recording portion.

20. The method according to claim 18, further comprising the steps of:
   determining that said respective recording portion does not contain said photo/picture identification impulse indicating that the respective recording portion is a dynamic image recording portion containing only dynamic video frames;
   determining that said respective recording portion contains an index identification impulse indicating a dynamic image search for individual dynamic video frames;
   replacing said index identification impulse indicating said dynamic image search with said index identification impulse identifying said desired static video frame; and
   ending retrieval of said static video frames for said respective recording portion when said index identification impulse identifying said desired static video frame is not present.

* * * * *